United States Patent
Matsakis et al.

(10) Patent No.: US 7,590,644 B2
(45) Date of Patent: Sep. 15, 2009

(54) METHOD AND APPARATUS OF STREAMING DATA TRANSFORMATION USING CODE GENERATOR AND TRANSLATOR

(75) Inventors: Nicholas Matsakis, Milford, PA (US); Charles Robert Morgan, Manchester, MA (US); Jeffrey Kenton, Weston, MA (US); Jan-Christian Nelson, Boston, MA (US); Cyrus Abda Dolph, V, Cambridge, MA (US); Eugene Kuznetsov, Cambridge, MA (US)

(73) Assignee: International Business Machine Corporation, Armonk, NY (US)

( * ) Notice: Subject to any disclaimer, the term of this patent is extended or adjusted under 35 U.S.C. 154(b) by 193 days.

(21) Appl. No.: 11/068,369

(22) Filed: Feb. 28, 2005

(65) Prior Publication Data
US 2005/0273772 A1 Dec. 8, 2005

Related U.S. Application Data

(63) Continuation-in-part of application No. 10/841,185, filed on May 7, 2004, which is a continuation of application No. 09/733,834, filed on Dec. 8, 2000, now Pat. No. 6,772,413.

(60) Provisional application No. 60/171,280, filed on Dec. 21, 1999, provisional application No. 60/171,281, filed on Dec. 21, 1999, provisional application No. 60/171,282, filed on Dec. 21, 1999, provisional application No. 60/171,283, filed on Dec. 21, 1999, provisional application No. 60/548,034, filed on Feb. 26, 2004.

(51) Int. Cl.
| | |
|---|---|
| G06F 7/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. .................. 707/101; 707/100; 707/102; 715/235; 715/236; 715/237; 715/239

(58) Field of Classification Search .................. 707/3, 707/10, 100–102; 715/235–239
See application file for complete search history.

(56) References Cited

U.S. PATENT DOCUMENTS 5,315,710 A 5/1994 Kishimoto et al.

(Continued)

OTHER PUBLICATIONS

Meszigues, XPath [onlne], [retrieved Aug. 29, 2006] Oct. 2002, Retrieved rom the Internet <http://en.wikipedia.org/w/index.php?title=XPath&oldid=1315639> Wikipedia.com, pp. 1-2.*

(Continued)

*Primary Examiner*—Apu M Mofiz
*Assistant Examiner*—Brent Stace
(74) *Attorney, Agent, or Firm*—Chapin IP Law, LLC; Barry W. Chapin, Esq.

(57) ABSTRACT

A high level transformation method and apparatus for converting data formats in the context of network applications, among other places. A flexible transformation mechanism is provided that facilitates generation of translation machine code. A translator is dynamically generated by a translator compiler engine. When fed an input stream, the translator generates an output stream by executing the native object code generated on the fly by the translator compiler engine. In addition, the translator may be configured to perform a bi-directional translation between the two streams as well as translation between two distinct protocol sequences. Further a translator may working in streaming mode, to facilitate streaming processing of documents.

27 Claims, 16 Drawing Sheets

U.S. PATENT DOCUMENTS

| | | | |
|---|---|---|---|
| 5,557,776 | A | 9/1996 | Brown et al. |
| 5,701,432 | A * | 12/1997 | Wong et al. .................. 711/130 |
| 6,725,421 | B1 * | 4/2004 | Boucher et al. ............. 715/205 |
| 6,920,462 | B2 * | 7/2005 | Kircher ................... 707/104.1 |
| 6,931,532 | B1 * | 8/2005 | Davis et al. ................. 713/167 |
| 6,938,204 | B1 * | 8/2005 | Hind et al. .................. 715/515 |
| 2001/0039540 | A1 * | 11/2001 | Hofmann et al. ............... 707/3 |
| 2002/0165870 | A1 * | 11/2002 | Chakraborty et al. ....... 707/206 |
| 2003/0110131 | A1 * | 6/2003 | Alain et al. ................... 705/51 |
| 2003/0126136 | A1 * | 7/2003 | Omoigui ..................... 707/10 |
| 2004/0205520 | A1 * | 10/2004 | Adams et al. ............... 715/503 |

OTHER PUBLICATIONS

Carlson, Stephen C., XSL Transformations [online], [retrieved Aug. 29, 2006]. Feb. 2003, Retrieved from the Internet <http://en.wikipedia.org/w/index.php?title=XSL_Transformations&oldid=902390> Wikipedia.com, pp. 1-2.*

Berglund, et al., XML Path Language (XPath) 2.0 [online], Nov. 2003 [retrieved on Sep. 11, 2006]. Retrieved from the internet:<http://www.w3.org/TR/2003/WD-xpath20-20031112/> W3C (w3.org), pp. 1-80.*

Google, "inlinining—Google Search" Jun. 2007, Google, pp. 1-2.*

Google, "inlining—Google Search" Jun. 2007, Google, pp. 1-2.*

Google, "define: inlinining—Google Search" Jun. 2007, Google, pp. 1.*

Google, "define: inlining—Google Search" Jun. 2007, Google, pp. 1.*

Nazmul, "Should I use SAX or DOM?" May 23, 1999, developerlife.com, p. 1-7.*

Evans, Clark, "YML—The Why Markup Language" Dec. 3, 1999, clarkevans.com, p. 1-6.*

Muller, D., "Why and How Not to Use Plain HTML", XP002166824, Jun. 5, 1996, pp. 1-18.

* cited by examiner

- Requires platform-specific static driver for each format (a-f)
- Converts from A to Z, then Z to F
- If formats change, need to stop operations & install modified drivers

METHOD AND APPARATUS OF STREAMING DATA TRANSFORMATION USING CODE GENERATOR AND TRANSLATOR

RELATED APPLICATION

This application is a continuation-in-part of U.S. application Ser. No. 10/841,185, filed on May 7, 2004, which is a continuation of U.S. application Ser. No. 09/733,834 issued U.S. Pat. No. 6,772,413, filed on Dec. 8, 2000, which claims priority from:
(1) U.S. Provisional Application 60/171,280, filed Dec. 21, 1999, entitled "Capability Based Apparatus and Method for Exchange of Digital Content and Data Between a Server Computer System and a Multitude of Client Computer Systems of Varying Capabilities";
(2) U.S. Provisional Application 60/171,281, filed Dec. 21, 1999, entitled "Data Oriented Programming Process for Integration of Disparate Computer Systems and Data";
(3) U.S. Provisional Application 60/171,282, filed Dec. 21, 1999, entitled "System for Flexible Dynamic High Performance Data Interchange Utilizing Interpreter an/or Runtime (Dynamic) Code Generation"; and
(4) U.S. Provisional Application 60/171,283, filed Dec. 21, 1999, entitled "Active Network System for Exchange of Structured E-Business and E-Content Data in a Multitude of Formats"; all of which are incorporated herein by reference.

This application also claims priority from U.S. Provisional Application 60/548,034 filed on Feb. 26, 2004 and which is incorporated herein by reference.

FIELD OF INVENTION

The present invention relates to data transfer, and more particularly to an automated system to effect data interchange.

BACKGROUND

Networks and networked applications have grown dramatically in number, size and complexity over the past decade. While the Internet is the most prominent example, internal LAN's (Intranets) and distributed computing are also part of this growth. By definition, all networked applications need to send and receive information over a network, often communicating with other applications. The great variety of formats in existence makes integration of applications and data sources a difficult and expensive problem. Current data encoding standards are constantly replaced by newer technologies, further complicating the problem of providing connectivity between network nodes. From bit-encodings of low-level network transport protocols to HTML and XML, the problem of data and protocol translation is a complex and difficult one, because of the need to provide both high flexibility and high performance.

One of the more recent data encoding formats enjoying wide adoption, especially on the Internet, has been XML, a part of the SGML family of document description languages.

The proliferation of interconnected sites or domains known as the World Wide Web ("Web") was initially developed largely using the document description language known as HyperText Markup Language (HTML). HTML was used predominantly to specify the structure of Web documents or "pages" using logical terms. HTML, however, has inherent limitations for Web document design, primarily resulting from the limited, predefined tags available in HTML to define elements in a document or page. Nonetheless, HTML-defined documents continue to exist in significant quantities on the Web.

EXtensible Markup Language (XML) was developed as a document format protocol or language for the Web that is more flexible than HTML. XML allows tags used to define elements of a page or document to, be flexibly defined by the developer of the page. Thus Web pages can be designed to effectively function like database records with selectively defined tags representing data items for specific applications (e.g. product code, department, price in the context of a purchase order or invoice document or page).

In the world of Web content, the use of XML is growing as it becomes the preferred data format in both business-to-business (B2B) and business-to-consumer (B2C) Web commerce sectors (e-business). The tremendous and continuing growth of XML in B2B applications has led to a great number of different XML e-business vocabularies and schemas. There are standardization efforts driven by industry associations, consortia, governments, academia and even the United Nations. Merely storing or transmitting e-business data "in XML" is not a guarantee of interoperability between e-business commercial entities or sites. Even the method of specifying a particular structure for an XML document has not been agreed upon, with several incompatible methods in wide use. It is therefore necessary to perform conversions between different XML formats to achieve server-to-server transfer of invoices, purchase orders and other business data in the e-business context. The problem of interoperability is exacerbated by the commingling of XML and HTML e-business sites on the Web.

Successful B2B and B2C sites are being called upon to support a greater variety of clients and client protocols. That is, sites must be accessible by different browsers running on clients, e.g. Netscape or Internet Explorer, and by different versions of these (and other) browsers. Additionally, the nature of clients and client protocols is changing and adding to the problem of interoperability. Different clients, in the form of Personal Digital Assistants (PDAs) and WAP (Wireless Application Protocol) enabled cellular phones, process XML content but need to convert it to different versions of HTML and WAP to ensure a broad and seamless reach across all kinds of web clients, from phones to powerful Unix workstations. As the diversity of web-connected devices grows, so grows the need to provide dynamic conversion, such as XML-to-HTML and XML-to-WAP, for e-business applications.

The World Wide Web Consortium has defined eXtensible Stylesheet Language. (XSL) as a standard method for addressing both XML-HTML and XML-XML conversions. There are several freely available and commercial XSL processor implementations for java and C/C++ e-business applications. However, standards-compliance, stability and performance vary widely across implementations. Additionally, even the fastest current implementations are much slower than necessary to meet the throughput requirements for either B2C or B2B applications. The great flexibility provided by XML encoding generally means that such conversions are complex and time-consuming.

The XSL World Wide Web Consortium Recommendation which addresses the need to transform data from one XML format into another or from an XML format into an HTML or other "output" format, as currently specified includes three major components in an XSL processor: an XSL transformation engine (XSLT), a node selection and query module (XPath), and a formatting and end-user presentation layer specification (Formatting Objects). XML-to-XML data translation is primarily concerned with the first two modules, while the Formatting Objects are most important for XML-to-HTML or XML-to-PDF document rendering. A typical XSL implementation comprises a parser for the transform, a parser for the source data, and an output stream generator—three distinct processes. Known XSL transformation engines (XSLT) typically rely on recursive processing of trees of nodes, where every XML element, attribute or text segment is represented as a node. Because of this, implementations suggested in the prior art simply optimize the transformation algorithms and will necessarily result in limitations on performance.

An XSL stylesheet is itself an XML file that contains a number of template-based processing instructions. The XSLT processor parses the stylesheet file and applies any templates that match the input data. It operates by conditionally selecting nodes in an input tree, transforming them in a number of ways, copying them to an output tree and/or creating new nodes in the output tree. Known XSLT implementations suffer from terrible performance limitations. While suitable for java applets or small-scale projects, they are not yet fit to become part of the infrastructure. Benchmarks of the most popular XSLT processors show that throughput of 10-150 kilobytes/second is typical. This is 10 times slower than an average diskette drive and roughly equivalent to a 128 Kbit/s ISDN line. Many websites today have sustained bandwidths at or above T1 speeds (1500 Kbit/s) and the largest ones require 100 Mbit/s or faster connections to the Internet backbone. Clearly, unless XSLT processing is to become the chief performance barrier in B2C and B2B operations, its performance has to improve by orders of magnitude.

There are a number of reasons for such poor performance. To transform one XML vocabulary to another, the processor must parse the transform, parse the source data, walk the two parse trees to apply the transform and finally output the data into a stream. Some of the better implementations allow the transform parsing as a separate step, thereby avoiding the need to repeat that step for every document or data record to be processed by the same transform. However, the transformation step is extremely expensive and consumes an overwhelming portion of processing time. Because XSLT relies on recursive processing of trees of nodes, where every XML element, attribute or text segment is represented as a node, merely optimizing the implementation of the algorithms cannot attain the necessary results. Thus current state-of-the-art XSLT implementations have to sacrifice performance in order to maintain the flexibility that is the very essence of XSLT and XML itself. So while XML and XSLT offer greater flexibility than older data interchange systems through the use of direct translation, self-describing data and dynamic transformation stylesheets, this flexibility comes with a great performance penalty.

Other known transformation or translation solutions implement "middleware" translation mechanisms. As represented in FIG. 1, in the middleware solution of the prior art, a large number of different platforms A-F, 101, 107 each may be arranged to communicate with each other. Each platform implements a format translator 103 to convert data streams between the local platform 101 and an agreed or common middleware format Z. The data stream in format Z can then be exchanged with any other node in the network. Each receiving node 107 then uses its own platform specific translator 105 to convert the data streams into a format preferred by the receiving node. Disadvantageously, such solutions require platform specific static drivers for each format. Conversion is laboriously performed by converting from the first platform format or protocol (A) to the common middleware format (Z) and then converting from the middleware format to the second platform protocol. In addition to the deficiencies in terms of time to effect such conversions, if formats change there is a need to stop or interrupt platform operations and install modified drivers in accordance with the format change(s). So while performance is often better than that of XML/XSLT solutions, flexibility is almost non-existent; performance is also considerably worse than that possible by using direct translation operating on the same formats.

Direct translation between two different formats or, more generally, two different protocols is the oldest method of achieving data interchange. By writing custom computer source code that is later compiled and installed on the target platform, it is possible to achieve interoperability between two different data formats. If the source code is carefully tuned by someone very skilled in the art, the resulting translator will be a high-performance one. However, it will not work if any change in data format or protocol occurs, and will require additional programming and installation effort to adapt to any such change. Direct translation can offer excellent performance, but it is even less flexible than the static adapters used by "middleware" systems.

Instead of a static adapter or custom-coded direct translator, it is the use of some kind of data or protocol description that can offer greater flexibility and, thereby, connectivity. U.S. Pat. No. 5,826,017 to Holzmann (the Holzmann implementation) generically describes a known apparatus and method for communicating data between elements of a distributed system using a general protocol. The apparatus and method employs protocol descriptions written in a device-independent protocol description language. A protocol interpretation means or protocol description language interpreter executes a protocol to interpret the protocol description. Each entity in a network must include a protocol apparatus that enables communication via a general protocol for any protocol for which there is a protocol description. The general protocol includes a first general protocol message which includes a protocol description for a specific protocol. The protocol apparatus at a respective entity or node in a network which receives the first protocol message employs a protocol description language interpreter to interpret the included protocol description and thereby execute the specific protocol.

Again, disadvantageously, the Holzmann implementation requires a protocol apparatus at each networked entity to interpret the protocol description. That is, the implementation is "node-centric" in that each node requires and depends on a respective translation function to a predetermined and fixed target format. Clearly, if one has the ability to equip every node in the network with a protocol interpreter such as the one described, one could conceivably equip every node in the network with a much simpler standard protocol stack to enable communication. On vast global networks, such as the Internet, it is practically impossible to change all network nodes over to a new protocol or data format—and this in turn drives the need for data interchange methods and devices.

Additionally, the implementation involves interpretation of protocol descriptions, which is a very resource-consuming process. The trade-off of Holzmann is quite similar to that made by XML/XSLT: by using self-describing data packets and a generalized interpreter, the implementation sacrifices a great deal of performance to achieve better flexibility and interoperability. Also Holzmann does not address the needs of next-generation Layer 6 and Layer 7 protocols (such as those based on XML-encoded data) for protocol translation, dealing instead with lower-level (Layer 3) protocols only.

The existing solutions to the general problem of data exchange between disparate systems and enabling connectivity between networked applications, provide either performance or flexibility, but never both.

Further disadvantages of the existing solutions include the fact that their performance is limited by the requirements of static interpretation between limited sets of static constructs. The higher the performance of the typical interpreter, the less flexibility its designers permit in the specifications of the formats. Also, even where the prior art has made provisions for adapting a format specification to changes, only one side of a specification can be changed while the other remains fixed. However, this generates a further disadvantage since it creates a "node-centric" system requiring all nodes to be changed in order to accommodate each new format specification. In addition, the typical data translators that operate as interpreters are relegated to the more stable protocols in the lower layers of the OSI model, thus severely limiting their usefulness in a rapidly changing environment.

Other disadvantages occur from the potential size of XML encoded data, a limitation that applies to all types of markup language encoded data including SGML, HTML and their derivatives. In the case of XML transforms, for example in XSLT/XQuery/XPath, the process takes as input one XML document and translates it into another. Although it is designed to work with XML, in effect it is a generic tree-based transformation description.

There are two general techniques for processing XML data. The first technique, often called the DOM (Document Object Model) method, reads all of the XML data and forms the corresponding tree in memory (commonly referred to as a DOM tree). After building the tree, the application program processes the data. The processing will consist of one or more traversals of the data in arbitrary order. As it performs these traversals, the application program generates the output in the form described the XSLT/XQuery/XPath data map. Typical examples of output are XML data, HTML documents, or text.

The DOM model has the advantage of generality and speed. However, it suffers from the requirement that the entire XML file must be consumed and stored in memory as a DOM tree before output can start being produced (alternatively, before schema validation can occur). XML encoded data is already bulky, and the need to consume an entire file puts great strains on memory consumption. As an example, a data file with XML encoded yellow page entries that is to be converted into HTML or SGML format would require a processor to consume and store in memory the entire XML data file before any output could be generated, even though the DOM tree may not have a very large number of levels.

The alternative method, called the SAX model, consists of combining the reading of the data with the processing. This is called streaming, the basic idea is that instead of reading the entire input into memory before beginning the transform, the input is processed as it is parsed. As each node is read the processor processes the data and then typically deletes the storage for that data. In other words the tree is not built. Instead the data is processed on-the-fly. When possible, this technique has the advantages of using less memory and lower latency. The memory savings come from the fact that one need not store the entire tree at any one time, but only pieces. The improved latency is due to the fact that output can be produced immediately rather than waiting for the entire tree to be parsed. The XML file may be huge and use only a limited amount of memory.

However at the present time there are not many ways to produce a streaming XML transform. Generally it is done by handwriting code in a general purpose programming language such as Java, using an API similar to SAX. This is tedious and error prone; the problems of writing XML transformations in general purpose programming languages are what led to XSLT's widespread adoption in the first place. There have been some efforts to design transform descriptions similar to XSLT that are specially crafted for writing streaming programs. STX is one example. However these languages are unfinished and none have acquired a widespread user base as of yet. Most significantly, they require network administrators or application developers to rewrite their existing applications in a different language to take advantage of possible benefits of a streaming processing model.

Accordingly, there is a need to allow to allow streaming XML transforms without losing the advantages offered by the wide adoption and the convenient tree model used by XSLT/XPath/XQuery, and related languages.

SUMMARY OF THE INVENTION

The present invention provides a high level transformation method and apparatus for converting data formats in the context of e-business applications, among other places. A flexible transformation mechanism is provided that facilitates generation of translation code on the fly.

According to the invention, a data translator is dynamically generated by a translator compiler engine. The translator compiler engine receives a data map (DMAP) and a pair of formal machine-readable format descriptions (FMRFDs). The first FMRFD is a formal description for data coming from a source node and the second FMRFD is a formal description of data for a destination node. All three data structures (i.e. the two dynamically selected FMRFDs and the DMAP) are used to generate executable machine code (i.e. object code), for running on the CPU of the host platform, to effect the translation from the source format to the destination format. When fed an input data stream, the data translator generates an output data stream by executing the native object code (which was previously generated on-the-fly by the translator compiler engine). In addition, the data translator may be configured to perform a bi-directional translation between the two streams.

In further accord with the invention, formal machine-readable format descriptions (FMRFDs) can be defined for each data format and/or network protocol. An FMRFD describes the structural layout of the packets or data streams or other data structures being translated. An FMRFD may also include descriptions of a protocol, being a sequence of data structures being exchanged. These FMRFDs may be manually or semi-automatically loaded into the system by operators familiar with each node, or may be developed, discovered or modified automatically during communication exchanges. For example, a table of FMRFDs can be configured for each node, and a new translator created on the fly for each new FMRFD-pair encountered. Alternatively, a translator can be built for specified packet types exchanged between nodes, and applied as the corresponding packet type is encountered. As another alternative, a translator can be supplied or generated according to the source and destination node identifiers, along with identified protocols, formats, and schemas. The translator is then re-used for further transactions between the identified communicants. Furthermore, a set of predefined or standardized schemas may be accessed according to transaction types.

In another illustrative embodiment, where the protocol is XML (extensible Markup Language), and the conversion map is described by an XSL (extensible Stylesheet Language) file, an XML stream translator can be completely replaced or augmented by an optimized translator operated according to the present invention. Machine instructions, in object code, are directly executed and produce the desired output. This illustrative embodiment comprises an optimized contiguous memory algorithm, the performance of which approaches that of a memory-to-memory copy utility at speeds orders of magnitude faster than an XSLT. However, unlike a hardwired optimization, which trades flexibility for performance, the present invention preserves the flexibility through the dynamic use of the FMRFDs derived from the XSL and their corresponding data map (DMAP).

Features of the invention include provision of a data translation mechanism that is not node-centric and avoids the need for a translation apparatus or mechanism at each networked entity. The method and apparatus facilitates the efficient exchange of data between network nodes of different protocols by dynamically adapting to protocol and format changes. The present invention provides a unique solution to the growing problem of integrating disparate or incompatible computer systems, file formats, network protocols or other machine data. It allows many more formats and protocols to be accommodated transparent to the users. The mechanism is flexible in that any protocol or format that can be formally described can be used. Older systems can be retrofitted according to the invention to take advantage of next generation protocols. High performance is obtained from dynamic code generation. The need to create, install, and maintain individual, customized translators is obviated thus providing flexibility and high performance in the same data exchange apparatus.

Whether it's XSLT, XPath, FMRFD, DMAP, XML Schema, XQuery, or some yet-unknown format-definition-and/or-transformation definition, the streaming present invention enables its processing in optimal and heretofore impossible ways.

An illustrative embodiment of the present invention includes a method of processing XML data (or any other similar data) in a streaming fashion, comprising consuming a portion of an XML-encoded input data stream, processing the consumed portion of an XML-encoded data stream based upon a transformation definition, and outputting result data produced as a result of processing the consumed portion of an XML-encoded data stream according to the transformation definition, wherein the result data is outputted before all of the XML-encoded input data stream has been consumed. The illustrative embodiment includes producing side effects, such as routing data, effecting a direction of flow of messages, or selection of subsequent processing steps. Transformation definitions include XML transforms, XSLT stylesheets, XPath expressions, XQuerys, XACML, XML encryption, XML digital signature, web services security processing and XML Schemas, or any other similar types of data.

The illustrative embodiment further includes compiling at least one XSLT stylesheet, including performing analysis of the at least one XSLT stylesheet, to determine whether at least some XML data to be processed in accordance with the at least one XSLT stylesheet can be processed in a streaming fashion. This may include determining whether the one XSLT stylesheet specifies access to data that is not readily available at a time of such access.

The step of outputting result data includes buffering at least some result data to maintain a proper order of outputting result data.

Another embodiment includes a method for transforming XML documents in streaming mode, comprising compiling at least one transformation definition, including analyzing the at least one transformation definition to determine if portions of it are streamable, generating executable machine instructions based on the step of compiling at least one transformation definition, the executable machine instructions to transform XML documents, and executing the executable machine instructions with aid of a streaming runtime process. This embodiment also includes determining whether the at least one transformation definition specifies access to data that is not readily available at a time of such access. The compilation may include breaking up the transformation definition into multiple strands, which can be executed on different processors. One or more optimizations are applied to generate optimized executable machine instructions.

Such optimizations include common subexpression elimination, constant propagation, code motion, loop unrolling, strength reduction, peephole optimization, dead code elimination, LRE Folding, type resolution and tightening, adaptive profile-guided optimization, template or method specialization, and inlining. Transforming XML documents in streaming mode includes buffering at least some result data to maintain a proper order of outputting result data.

Another embodiment includes a network appliance device for performing streaming XML processing, including an input port to consume a portion of XML-encoded input data file, executable machine instructions generated by compiling a transformation definition, wherein the compilation includes analyzing the transformation definition to determine whether XML-encoded data processed in accordance with the transformation definition can be processed in streaming mode, the executable machine instructions coupled to the input port, to process the portion of an XML-encoded input data file, wherein the executable machine instructions processes the portion of an XML-encoded data file outputs result data before all of the XML-encoded input data file has been consumed by the input port. It includes at least one output buffer, the output receiving result data from the executable machine instructions, and wherein the output buffer holds result data until after other result data has been outputted by the executable machine instructions. This network appliance device can serves primarily as a web services security gateway (also known in the industry as XML firewall or XML security gateway).

Another embodiment includes a method for processing a file that specifies XML processing, based on a transformation definition, the method including processing the transformation definition to produce machine instructions for processing the file, wherein the machine instructions allocate output buffers as required for the transformation definition, the output buffers to store output occurring out of order based upon processing of the file, and wherein the output buffers will send the stored output in a sequence as specified by the transformation definition. Typically, one of the output buffers waits until other output is sent before sending stored output.

Yet another embodiment includes a method of establishing and optimizing a type of an XPath/XSLT/XQuery variable, including making an initial approximation by searching an intermediate representation of the XPath/XSLT/XQuery expression for uses of a variable, computing a set of possible types for the variable based on usage of the variable, and optimizing parameter types by deducing restrictions on the computed set of possible types of parameter variables. The initial approximation typically uses an empty set of types as an optimistic prediction. Type information explicitly specified by XPath 2.0, or XML Schema may be used for computing a set of possible types for the variable.

Yet another embodiment includes a method of XML routing using streaming XPath expressions, including receiving a portion of incoming XML-encoded data, evaluating at least one XPath expression in a streaming mode to the received data, and routing at least one copy of the incoming data to different destinations depending on a result of evaluating the at least one XPath expression. As subsequent fragments of the incoming data are received, the at least one XPath expressions can be evaluated or re-evaluated, and the incoming data is sent to additional destinations based on the result of such evaluation or re-evaluation.

Yet another embodiment includes an apparatus for streaming mode XML processing, comprising a compiler capable of generating executable machine instructions from XML processing definition files, the executable machine instructions to process input XML data in streaming mode, a push-mode XML parser capable of producing parse trees or parse events based on the input XML data, a parse event distributor, to receive data from the push-mode XML parser; and an out-of-order output buffering system; to buffer output from processing the XML input data.

BRIEF DESCRIPTION OF THE DRAWINGS

These and other features of the present invention will be better understood in view of the following detailed description taken in conjunction with the drawings, in which.

DETAILED DESCRIPTION

Figure 1:
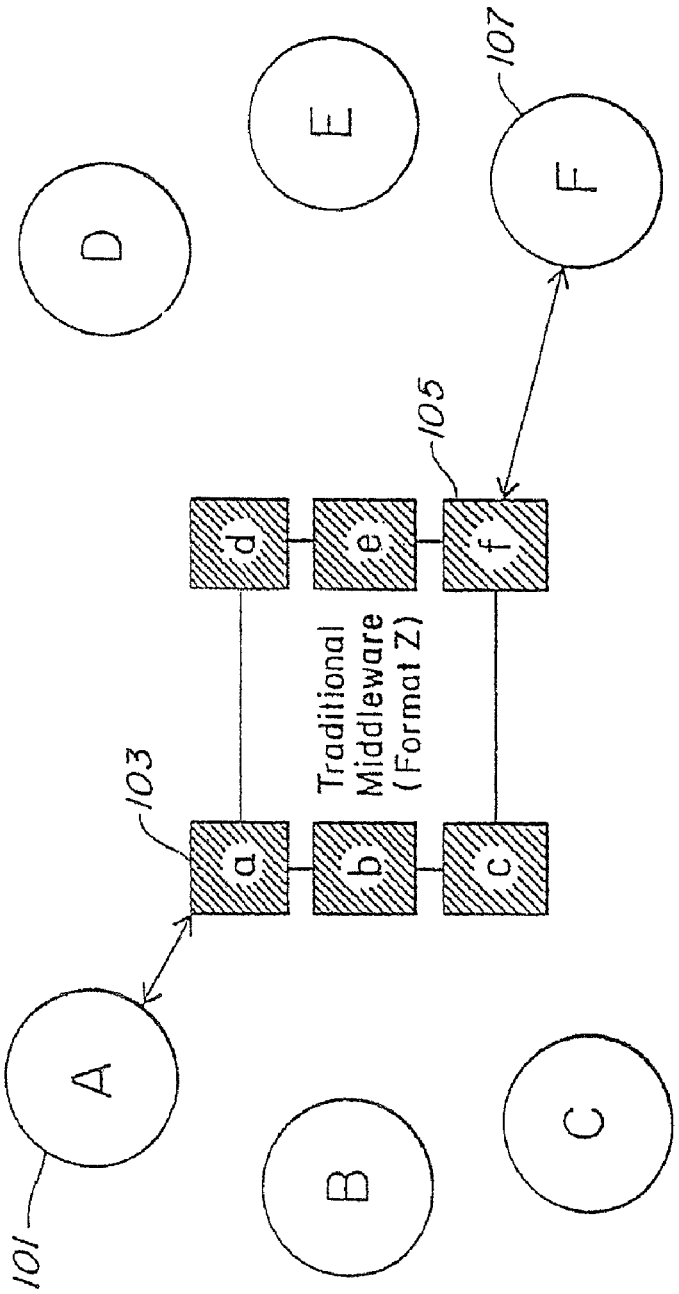
FIG. 1 is a block diagram of a software architecture according to the prior art.

Each node in a data communication network has a preferred data format in which it transmits and expects to receive data. As illustrated in the prior art FIG. 1, because the rapid development of data formats and protocols often results in multiple variations and implementations, two nodes A and F in a network may have differing format implementations (a) and (f), respectively. The present invention generally provides a system whereby information exchange between pairs of communicants is facilitated through run-time creation of or modifications to a data format translator, according to information known about their respective data formats.

At runtime, a data map is obtained for translation from a source format specification to a destination format, and the map is used, together with the protocol descriptions, to configure a translator compiler engine. The translator compiler engine then generates a specialized translator in machine code form. This translator consists of dynamically generated object code that, when executed, effects the translation of a data stream from format a to format f. Data streams are thus converted directly from one format to another without first converting to an intermediate format. Any change in format descriptions or desired mappings can be immediately accommodated by regenerating the specific data translator and using the new version for future translations.

Figure 2:
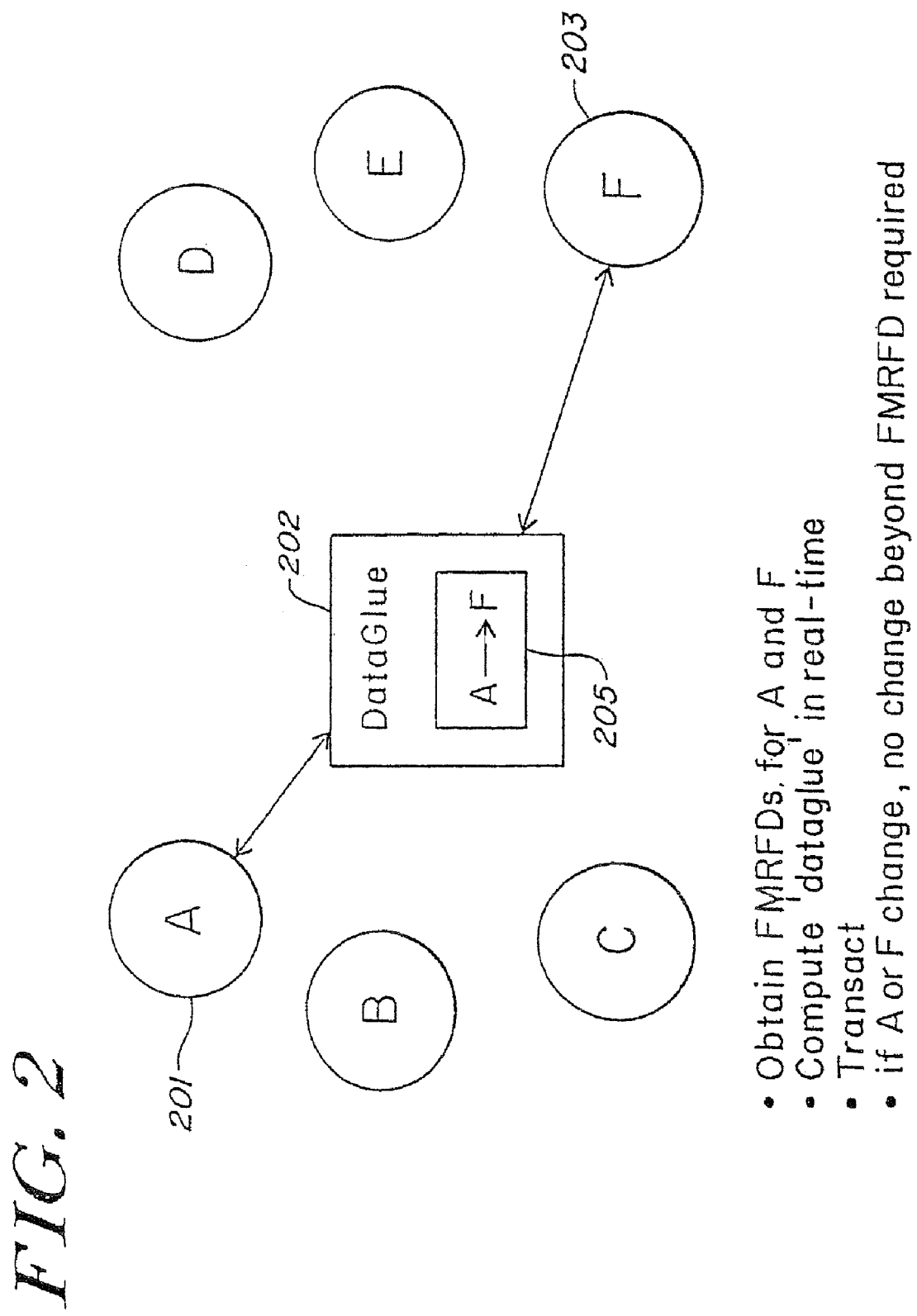
FIG. 2 is a high-level software architecture according to the present invention.

As shown in FIG. 2, data between two communicants 201, 203 can be translated directly from one format to the other (and vice versa) without the need for an intermediate format translation. A translator 205 implemented according to the present invention converts the data streams directly from the format (a) of one node A 201 to the format (f) of the other node F 203. A system implemented according to the present invention generally includes a translation processor 202 that includes a dynamically created translator 205 for translating between each pair of formats. Numerous translators can be concurrently implemented between two nodes, as where different formats are used in different protocol layers, or for different transactions, or at different times.

Figure 3:
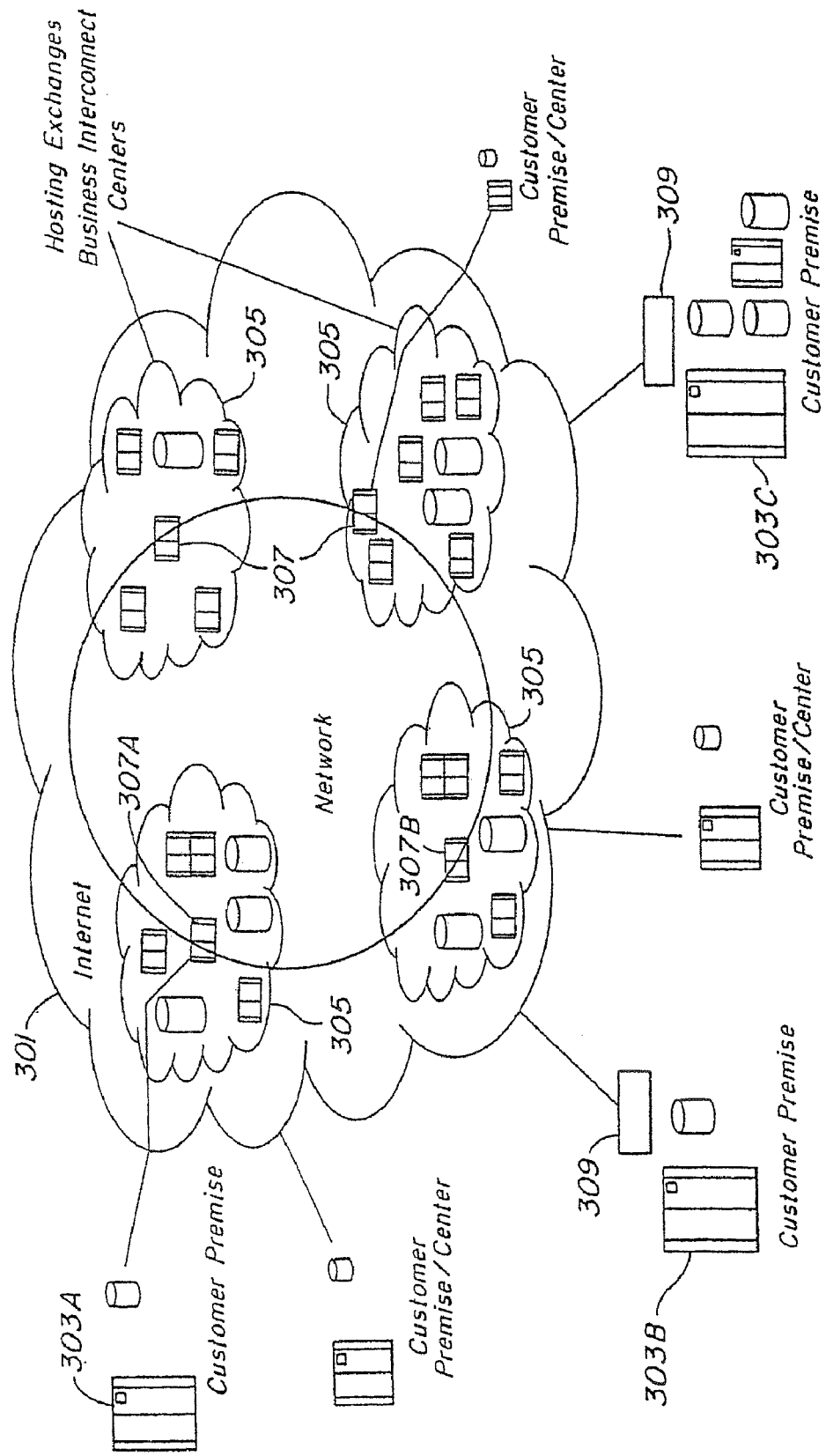
FIG. 3 is a block diagram of a network environment in which the present invention is implemented.

FIG. 3 presents a network diagram in which components which embody the present invention are configured in a number of illustrative variations applicable to a communication network environment. Computer systems at customer premises 303A, 303B are connected to the Internet 301 using standard communication protocols and using implementations of recognizable data formats. Communications between customer premises may transit various information services hosted at Hosting Exchanges or Business Interconnect Centers 305. To facilitate the transformation of data formats between centers, processors 307 (such as processors 307A, 307B) configured according to the present invention may be implemented at selected centers. For other customer premises there may be a need to have localized processors 309 configured to generate the translators and make the data transformations in accord with the present invention. The latter configuration permits direct interconnection of such sites 303B, 303C, via the Internet 301, without necessarily traversing any of the interconnect centers 305.

There are several possible scenarios for translating between the two formats used by different nodes. For example, a first node F can be equipped with a translator, designed according to the present invention, and that translates the data as it arrives from any typical source (i.e., a second node A), according to the format of the received data. This provides the advantage that the translation operations at the receiving node F can be optimized according to the types of messages received from the world. A further advantage of this configuration is that none of the other nodes must be reconfigured or reprogrammed, since they each communicate with F using their own preferred formats, oblivious to the fact that F contains a translator.

Secondly, a transmitting node A can be equipped with a translator that first translates a message into the destination format of F, thus relieving F from having to recognize and translate a foreign format. Thirdly, both nodes A and F can be equipped with translators and negotiate an optimal format for exchange between them. Nodes A and F can also negotiate which one will perform any translation necessary to achieve the agreed optimal format. Again, only one node or the other is burdened with making the translation. Fourth, neither node A nor F is equipped with a translator, however the network is equipped with a translator configured according to the present invention. Transmitter A sends its message in format (a) to the translator node, the translator recognizes the packet as encoded in the format of A and retrieves the necessary transforms from format (a), used by A, into format (f), used by destination node F. The interconnector makes the necessary translation and forwards the packet to F. This not only frees up both A and F from the translation, but also permits the translator functions to be shared among other nodes.

Figure 4:
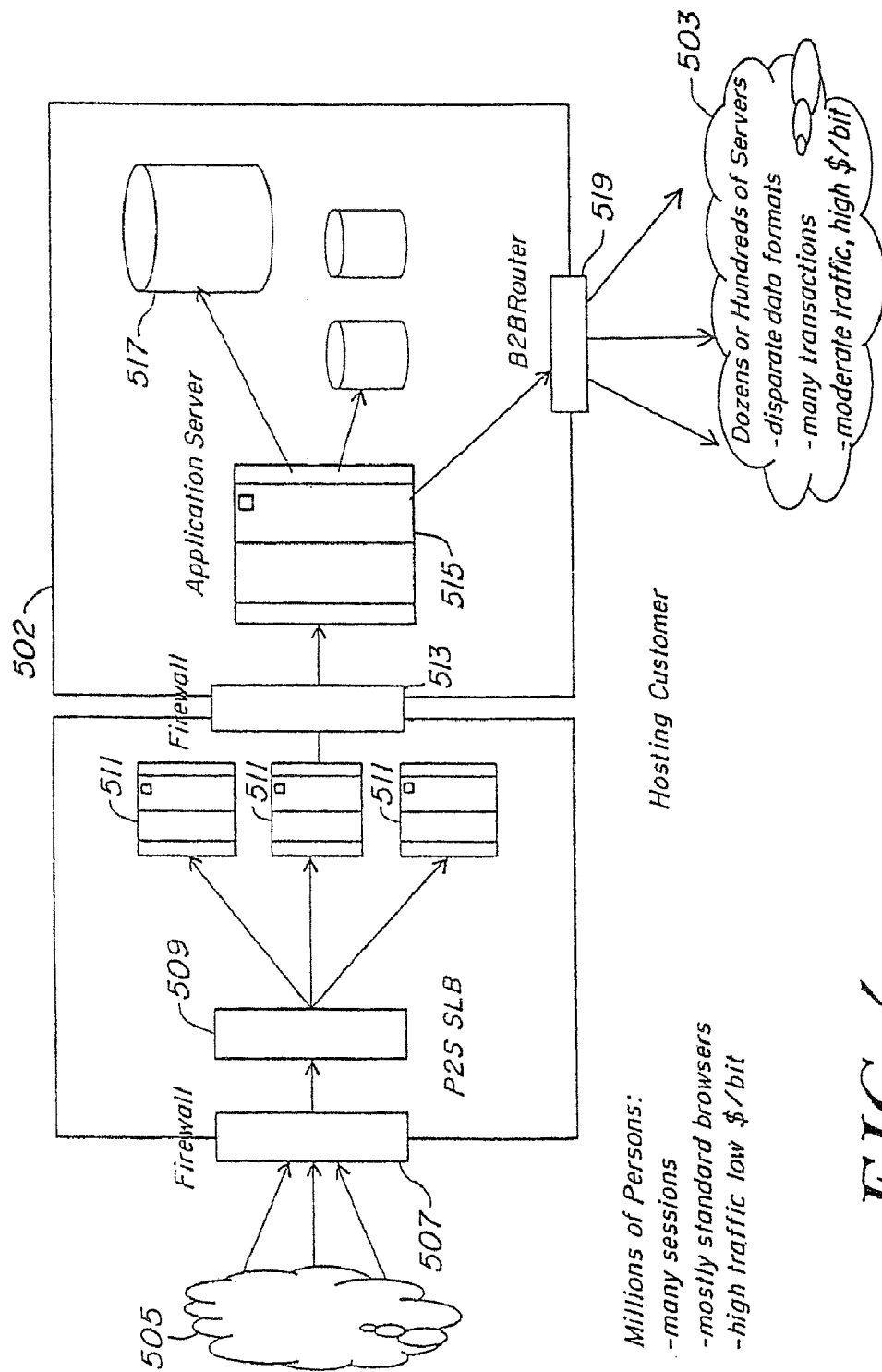
FIG. 4 is a more detailed block diagram of a representative network site in which the present invention is implemented as a B2B router.

FIG. 4 shows an environment in which implementation of the present invention may provide particular advantages: the business-to-business (B2B) environment. Users generate a high number of low-value transactions via the Internet. Validated customers can access a business through the firewall 507 connected to the Internet 505. Transactions of various kinds (such as information exchanges or purchases) are handled by the front-end interface program 509 which uses the services of a number of back end servers 511 for selected tasks. For example, an Internet user may request a purchase, and the back-end servers determine what the present inventory levels are for the requested items, and whether the user is in the shipping database.

In another scenario, the transaction may be a credit card debit in which a back-end server periodically contacts a clearinghouse for verifications or adjustments. In any case, many web-based businesses contract with other operators to provide application services 502. Application services may include, for example, electronic data interchange (EDI) transactions for effecting automated E-commerce, document distribution and publication, or other electronic record transactions. The customer servers 511 communicate through firewall 513 to the application service sites 502, either via the Internet or through other online communication means. The application servers 515 at the application service site 502 interact with local information assets and processes 517 to determine what further B2B transactions may be necessary to fulfill the customer request.

Application server 515 then advantageously uses a network element, such as a B2B router 519 implemented according to the present invention, to reach other application servers in the high-performance portion of the Internet 503. Because of the disparate data format implementations among different application servers, a data format translation is often required. Because of the high volume of transactions, and the relatively high value of each transaction, customized translations are economically justified, but are still costly, lengthy and risky. The length factor increases the time-to-market for new products and services, and the risks include those arising from lack of protection against future format changes and resultant possibility of connection breakdown. Furthermore, using systems implemented in the prior art, it is difficult to avoid the classic trade-off of performance versus flexibility.

It is axiomatic in the field of data communications software that one may either have a customized, high-performance interface for two rigidly defined protocols and the accompanying total lack of flexibility, or one may have a more generalized translator which has much less performance but with the run-time agility to properly handle a variety of inputs. The present invention achieves high performance objectives, while retaining the same run-time agility of a generalized translator, through the use of dynamic optimization of the software being executed for a particular transaction or frame being processed. It also simplifies integration or migration by reducing the system implementers from the constraints of labor-intensive coding. It also facilitates the creation of next-generation solutions, without the requirement of waiting for adoption of a particular set of data exchange standards, by permitting a dynamic adaptation as protocols and formats change.

Additional description can be found in U.S. Provisional Application 60/171,280, filed Dec. 21, 1999, entitled "Capability Based Apparatus and Method for Exchange of Digital Content and Data Between a Server Computer System and a Multitude of Client Computer Systems of Varying Capabilities", which is incorporated herein in its entirety. Additional description can be found in U.S. Provisional Application 60/171,281, filed Dec. 21, 1999, entitled "Data Oriented Programming Process for Integration of Disparate Computer Systems and Data", which is incorporated herein in its entirety. Additional description can be found in U.S. Provisional Application 60/171,282, filed Dec. 21, 1999, entitled "System for Flexible Dynamic High Performance Data Interchange Utilizing Interpreter an/or Runtime (Dynamic) Code Generation", which is incorporated herein in its entirety. Additional description can be found in U.S. Provisional Application 60/171,283, filed Dec. 21, 1999, entitled "Active Network System for Exchange of Structured E-Business and E-Content Data in a Multitude of Formats", which is incorporated herein in its entirety.

Although the invention is described in a data networking context for a B2B router, it should be appreciated that such a high-performance and flexible format translation mechanism can be implemented in many other contexts. The generalized system can be applied to the growing problem of integrating disparate or incompatible computer systems, file formats, network protocols, or other machine data. This applies whether the data is recorded in a storage device, preserved in temporary memory, or transmitted over a network. This approach allows many more formats and protocols to be accommodated flexibly while preserving the performance and simplification advantages.

Figure 5:
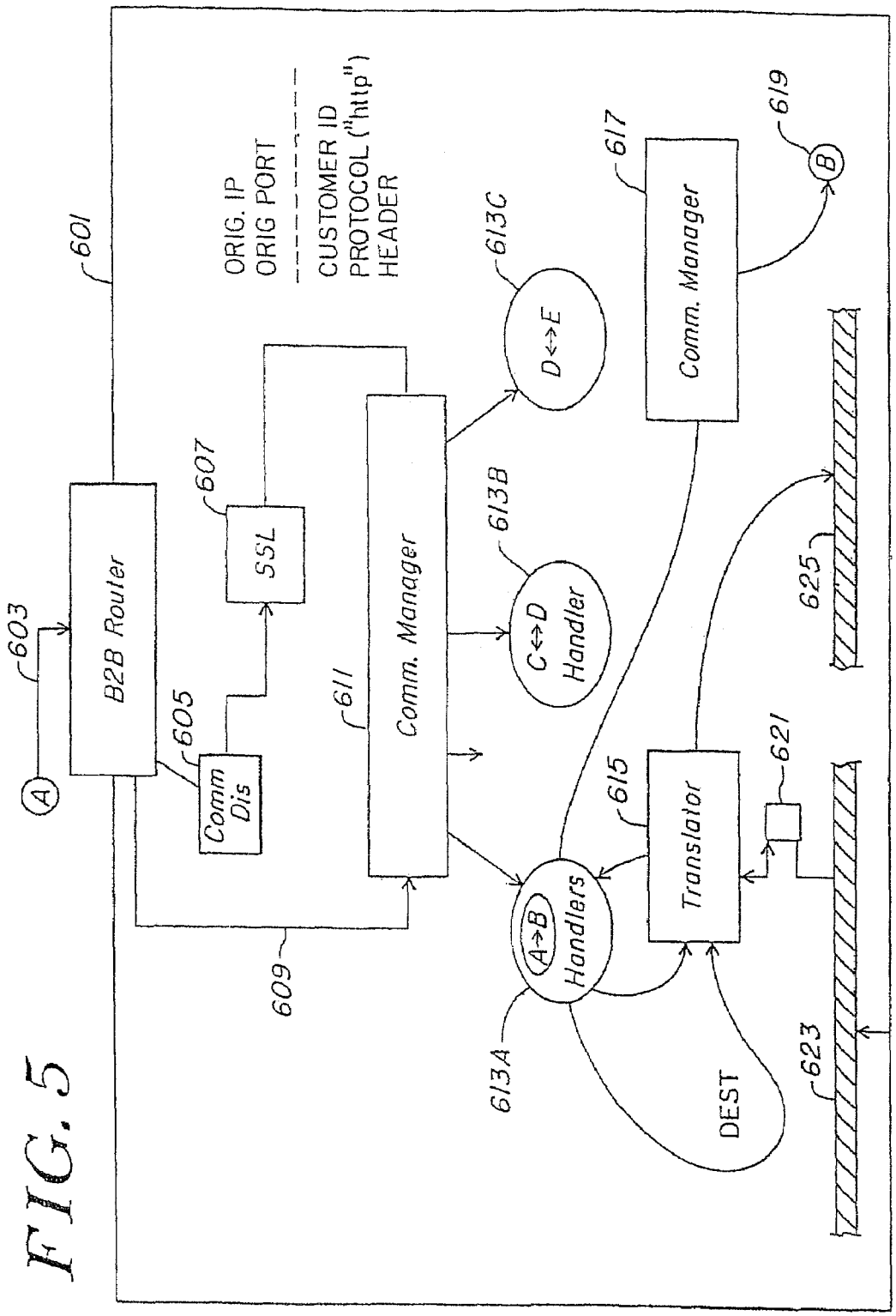
FIG. 5 is a more detailed block diagram of an illustrative embodiment of a B2B router using the present invention.

In an illustrative embodiment of the present invention, shown in FIG. 5, a business-to-business router 601 comprises the following components. The incoming data stream is received by a communication dispatcher 605 for handling communication with the other (incoming) communicating party. Where the dispatcher 605 recognizes an encoded protocol, such as encrypted or compressed, an optional decoder 607 is employed in a manner typical in the art of security (e.g., secure socket layer, "SSL") or compression or other encoding. The decoder decodes portions of the received data stream to form a decoded stream. The decoded stream can then be further processed for additional identification information by the communication manager 611. Using the identification information, a communication handler 613A is selected from a plurality of communication handlers 613A, 613B, 613C for managing the flow of information to and from a translator 615. Each translator 615 converts an input data sequence into an output data sequence, and the data handler routes the output sequence to an appropriate outgoing communication manager 617. The outgoing communication manager 617 then communicates with the destination node of the transaction 619. The destination node is typically another B2B router or another server, when implemented in the data network context.

A stream of data 603 arrives from an external source, such as an application server 515, and headers and other selected fields are separated 605, 609 and processed 607, 611 to detect source and destination identification information, along with the data format and protocol being used. At the lowest protocol levels, a unique address or other identification will suffice for identification, such as the combination of an IP address and a socket corresponding to a current communication channel. Protocol identification can be a configurable parameter, or determined by reference to standard identification fields in the messages, or may be determined empirically, such as by mapping against a known set of permitted protocols. Similarly, the format specification may be configurable, or by reference to standard identification fields in real time.

At higher protocol levels, perhaps after decryption (or multiple steps of decryption, decompression, and validation at different protocol levels), a customer ID, transaction code, or other packet-specific identification may be derived from the packet itself. Implementations of selected protocols may benefit from retention of temporary state information, such that the communication manager need not fully decode succeeding packets from the same stream, provided that the stream has already been uniquely identified for further processing. State information is stored in an optional scratch memory or finite state machine 621, and used by the translator 615 as necessary. For example, an invoice document has already been identified as between specific parties, and the next document in the same channel can be processed more quickly because the system can be configured to select and re-use identification information, or other content learned earlier.

Using the identification information, a communication handler 613A is selected from a plurality of communication handlers 613A, 613B, 613C, if one exists for the identified combination of source and destination nodes (at a given protocol layer). Otherwise a new handler may be created, depending upon predefined optimization criteria. Data content obtained from the input stream is routed through the selected data handler 613A, translated (i.e., transformed) as necessary by the corresponding translator 615, and forwarded to a connection manager 617 for the destination node 619.

For example, handler 613A for A->B receives information streams from source A destined to target B, where A and B can each be defined as a particular data format/protocol/address node pair within the network. Another handler 613B for C->D receives information for another identified node pair, where C->D may handle translation of a different protocol layer in the A->B transaction, or may simply handle translations of the same protocol layer between different source and destination addresses. Where format-checking or data checking reveals an exception case (i.e., an error or unexpected data), a more general-purpose parsing and error-handling routine can be triggered, with concomitant performance penalties.

The selected data handler 613A selects the corresponding translator 615 which accepts a memory segment (e.g., a buffer) 623 as input. Translator 615 executes its native translator program and generates an output stream 625. The handler 613A then interacts with the connection manager 617 to schedule the outgoing transmission to the destination node 619.

Figure 6:
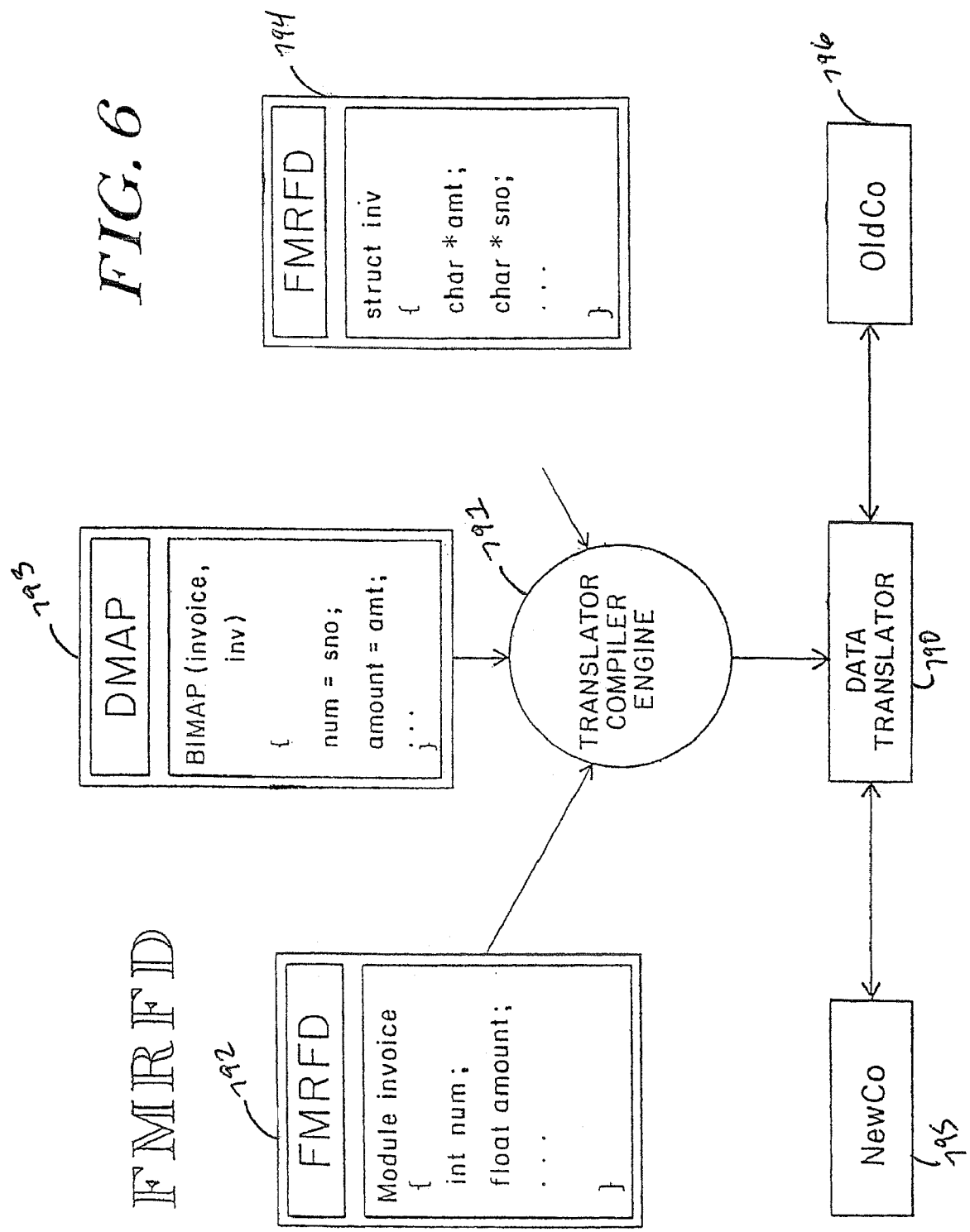
FIG. 6 is a block diagram showing an illustrative embodiment of the invention for configuring a translator compiler engine to create a translator for converting data formats between two data streams.

The translator 615 is schematically diagrammed in FIG. 6 in which a data translator 790 is dynamically generated by a translator compiler engine 791. The translator compiler engine 791, implemented according to the present invention, has three inputs: a first FMRFD 792, a DMAP 793, and a second FMRFD 794. The first FMRFD 792 is a formal description for data coming from a source node and the second FMRFD 794 is a formal description of data for a destination node. The translator compiler engine 791 receives and uses all three data structures to generate executable machine code native to the data translator 790, for running on the CPU of the host platform, to effect the translation from the source format to the destination format. When fed an input data stream 795 the data translator 790 generates an output data stream 796 by executing the native object code (which was generated on the fly) provided by the translator compiler engine 791. In addition, data translator 790 may be configured to perform a bi-directional translation between the two streams 795, 796.

An optional finite state machine (FSM) 621 can also be implemented beneficially, as determined by the application, where states and their transitions are defined in a typical manner known to those skilled in the art, such as with sequences of packet types and their contents. For example, where a specific type of packet is generally followed by another identified type (or some determinable number of acceptable packet types), the translator engine can use an FSM to reflect the known protocol, thus reducing the number of validating tests that must be made on subsequent packets.

An FSM can also be used for handling protocol sequence differences between the standards adopted in nodes A and B. For example, assume node A uses a protocol with a "double handshake", whereas node B uses a protocol with a single message and acknowledgement. Node A will only send a second packet when it has received an "OK" from node B, and node B will only send an "OK" message when it has received a complete message sequence from node A. An FSM can be implemented to avoid a deadly embrace in which node B is waiting for the next data packet, while node A is waiting for node B to acknowledge the first packet. Under the prescribed circumstances, the FSM would trigger the necessary acknowledgement packets back toward A in order to receive and forward the next packet to B, which would then generate the actual node B acknowledgement. An FSM can be implemented separately from the data translator or directly compiled into its runtime-generated code, depending on specific requirements. Error detection mechanisms are also provided as necessary to handle missing or unexpected packets, or other transitions for which the FSM need not be optimized.

According to the invention, a formal machine-readable format description (FMRFD) can be defined for each data format preferred in each node. These FMRFDs may be manually or semi-automatically loaded into the system by operators familiar with the data formats of each node, or may be developed, discovered or modified automatically during communication exchanges by inspection of the formats of messages being exchanged between communicants.

For example, a set of FMRFDs can be configured for each node, and a new translator created on the fly for each new FMRFD-pair encountered. Alternatively, a translator can be built for specified packet types exchanged between nodes, and applied as the corresponding packet type is encountered. As another alternative, a translator can be supplied or generated according to the source and destination node identifiers, along with identified protocols, formats, and schemas. The translator is then re-used for further transactions between the identified communicants.

Because data format implementations may vary from one site to another, the format identification for an identified connection can be used as an index to select how data exchanged with the identified correspondent will be handled.

Format implementations may also change from one connection to the next, and may also change according to other local factors (such as on-going testing of new formats, down-level forms in some workstations, or user errors). An FMRFD may also include descriptions of a protocol, being a sequence of data structures being exchanged between communicants.

In one illustrative embodiment, fields of a record or sections of a transmitted document can be defined as logical packet segments, and used to build an FMRFD. A description of a logical packet segment comprises one or more of the following:

A segment identifier (field name or sequence number),
Position relative to other segments,
Position relative to start of packet,
Data type (which may further refer to another packet description),
Constraints on data found in this field,
Byte and bit offset,
Reference to other segments for further information necessary to decode this segment (e.g., array length, optional field),
Primer, a start tag or sequence of segments or values indicating the start of the segment, and
End tag, and end tag or sequence of inner segments or values indicating the end of the segment.

An FMRFD may be expressed in any number of standard or proprietary formats, memory tables, computer languages or notations. Some examples include: ASN.1 (Abstract Syntax Notation One), IDL (Interface Definition Language), BNF (Backus Naur Form) variants, C/C++, java, VHDL, Verilog, lexx/yacc, SDL (Specification and Description Language), MSC (Message Specification Chart), HTML (HyperText Markup Language), XML, runtime object introspection information, or any combination of these.

In some cases, such as XML, the user data is intermixed with the format specification through use of markup or tagging. In other cases, such as ASN.1, a packet of user data may refer to the appropriate format specification. In yet other cases, such as raw data streams or buffers, the user data and the format may be entirely separate and their correspondence has to be known or established through other means. Combinations of these models are also possible, with additional opportunities for validation and error checking.

A DMAP is created when formal descriptions of two differing data formats are combined into a data segment mapping structure for each communicating node. Each logical packet segment of an FMRFD can be compared with those of a target FMRFD and a mapping arranged. Given two FMRFDs, a specific set of bytes in format X are always transformed into a specific set of bytes in format Y, according to the data segment mapping. For example, data structures identified by a set of tags in one format are mapped to different data structures with the same tags in the other format. A translator compiler engine then creates new executable object code for a run-time translator, according to the data formats and segment mappings.

DMAPs may be expressed in any one or combination of the notations used by FMRFDs, as described above. In one implementation, there is a purely binary-to-binary mapping whereby each input symbol is mapped to an output symbol.

Furthermore, a set of predefined or standardized schemas may be accessed according to transaction types. The recent emergence of web services directories composed of protocol descriptions used for e-business communication would be another possible source of protocol format description information for the invention generally and the B2B router embodiment, specifically.

Figure 7:
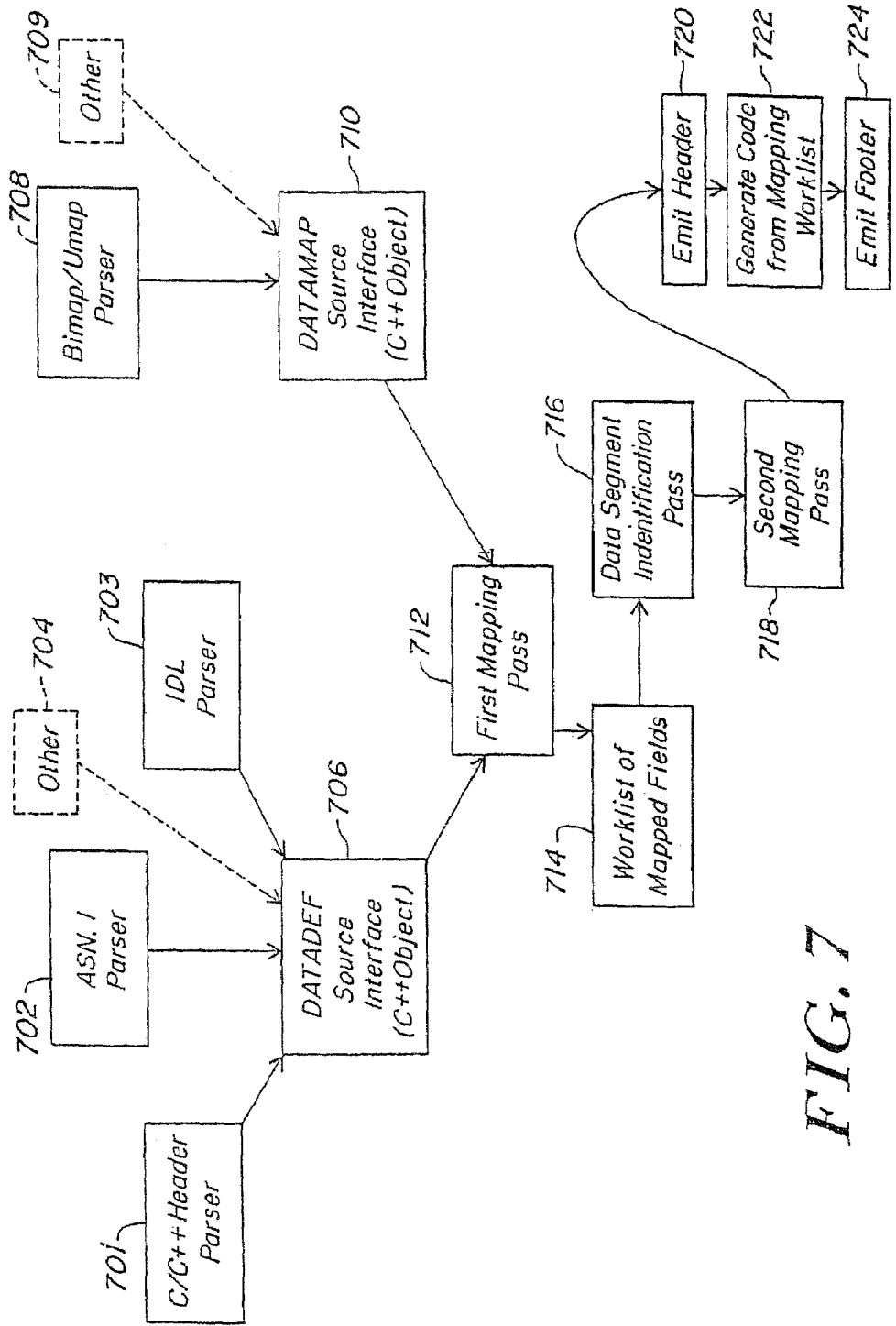
FIG. 7 is a block diagram of an implementation of a translator compiler engine according to an illustrative embodiment for binary translations.

FIG. 7 is a diagram of an illustrative embodiment of a data translator compiler for the general case of configuring a compiler for generating a translator adapted to translating binary data streams. One or more FMRFD parsers 701, 702, 703, 704 provide inputs to a DATADEF source interface 706, and one or more DMAP parsers 708, 709 provide inputs to a DATAMAP source interface 710. A first mapping pass 712 utilizes the DATADEF 706 and DATAMAP 710 to create a worklist of mapped fields 714 which is fed to a data segment identification pass 716. These interim results are then subject of a second mapping pass 718. The translator then emits a header 720, generates executable cod from the mapping worklist 722, and emits a footer 724.

The parsers can be selected as appropriate for parsing FMRFD inputs provided as C/C++ Headers 701, ASN.1 formats 702, IDL 703, or other standard or proprietary parsers 704 can be adapted to generate the required DATADEF 706 from the corresponding FMRFD formats. Similarly, DMAP parsers can be implemented as a bitmap/umap parser 708 or can be replaced or supplemented with other parsers as may be appropriate to other standard or proprietary formats of the mapping inputs provided to the translator compiler.

Once a DATADEF 706 and DATAMAP 710 have been created from the FMRFDs and the DMAP, the first mapping pass 712 is executed. During this operation, each field in the DATADEF 706 structure is validated and mapped to an intermediate structure kept in the worklist of mapped fields 714. Fields implemented as embedded structures, forward references, or pointer structures cannot always be resolved in the first mapping pass, and these instances can be accommodated using intermediate constructs as are known in the field of general software compiler design.

The worklist of mapped fields 714 is then passed to the data segment (or fragment) identification pass 716. In the operation of this pass, the individual fragments of the data packet layout are identified. This step provides the opportunity to ease and perhaps optimize the data translation operation. A data segment is an addressable consecutive memory region. Information within a segment can be identified as an offset within a particular segment. A packet (or other structure to be translated) will often include information which is stored in multiple segments. The term "fragment" refers to information which is stored in a non-contiguous memory location, and which is thus directly addressable without computation of an offset. After the data segment identification pass 716 is complete, the second mapping pass 718 is carried out. In this second mapping pass, the system resolves the remaining internal references that could not be handled during the first mapping pass 712. The result is a complete mapping worklist that can be used for generating object code.

The data translator compiler then completes its operation by emitting a function header prologue, and generating code 722 for all fields in the mapping worklist, and then emitting a function footer 724. The ultimate result is an object code load module that can be immediately executed on the target machine to perform a translation from an input data format to an output data format.

Although the illustrative embodiment is described in terms that result in the generation of executable machine code (binary), those skilled in the art will appreciate that the result of a translator compiler engine may also be output in other forms such as assembly code, byte-code, or other op-codes. These other forms of output may be destined for execution by other machines, such as interpreters. Similarly, the output of a translator compiler engine can be fed to a Field Programmable Gate Array (FPGA) for configuration of hardware gates (solid-state switches) that would implement all or part of a translator in hardware.

Any number of such translators can be implemented simultaneously, such that an entire set (or selected subset) of packets can be translated during runtime. However, the system implemented according to the present invention, with a translator compiler engine, retains the ability to create new translators as the need arises during run time processing. Thus, even a first protocol exchange between new partners may be run through an optimized translator which has already become optimized for the two nodes according to the known (or derived) information about the transaction. As further transactions or exchanges proceed, the data translator compiler engine can be manually or automatically and dynamically optimized for generating a more specialized translator for handling what become "familiar" packet types or sequences.

It should be apparent to those skilled in the art that a DMAP can also trigger the generation of additional code for carrying out runtime computations within the data stream. For example, where an output packet format requires a checksum, the translator can be adapted to perform the necessary calculations over the translated data and provide the necessary checksum. As another example, a DMAP may define the presentation of a subtotal number which would require a specified generic calculation based upon translated data. An implementation according the present invention may also incorporate predefined functions, or references to external functions that can be called at runtime, according to the needs of the translator, as generated by the translator compiler engine.

In another illustrative embodiment, where the protocol is XML (eXtensible Markup Language), and the conversion map is described as an XSL (eXtensible Stylesheet Language) file, an XML stream translator can be completely replaced or augmented by an optimized translator operated according to the present invention. As currently specified by the Worldwide Web Consortium, there are three major components in an XSL processor: XSLT, the transformation engine; XPath, the node selection and query module; and Formatting Objects, the formatting and end-user presentation layer specification. XML-to-XML data translation is primarily concerned with the first two modules, while the Formatting Objects are the most important for XML-to-HTML or XML-to-PDF document rendering.

Figure 8A:
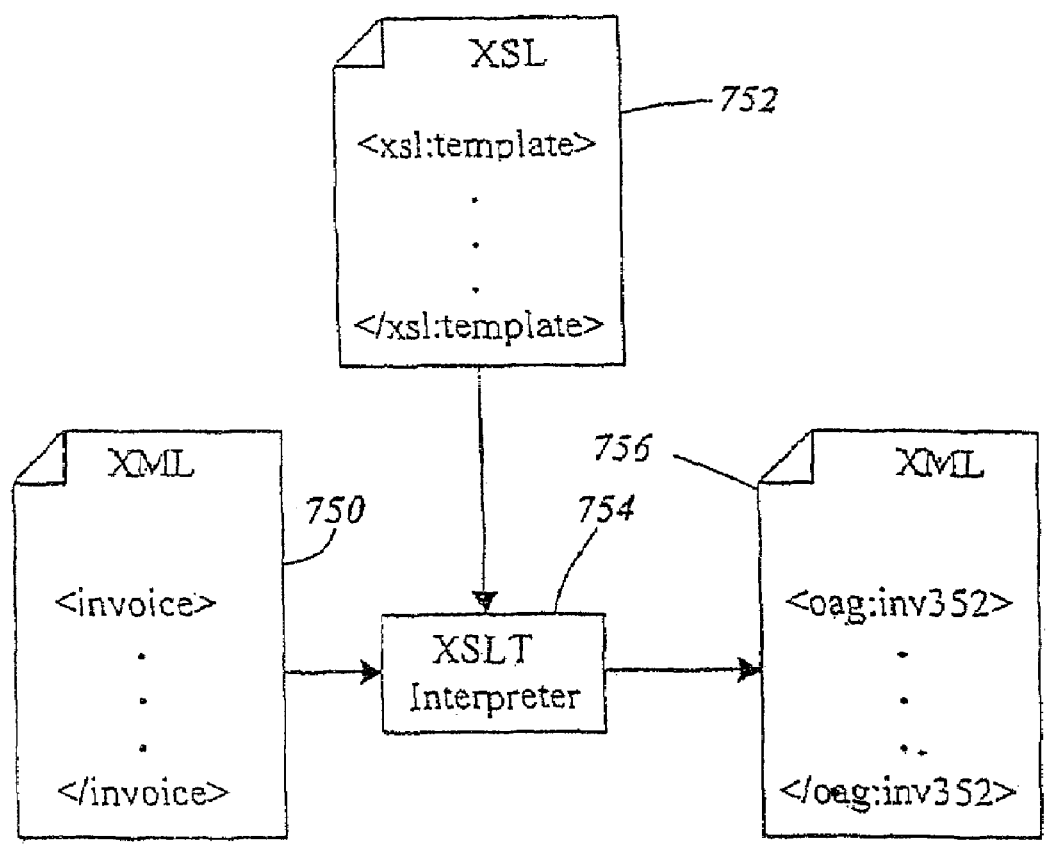
FIG. 8A is a block diagram of a prior art software environment in which an XSL translator interprets between two XML formats.

FIG. 8A illustrates a typical environment in which an XSLT interpreter 754 is implemented. An XSL stylesheet 752 is itself an XML file that contains a number of template-based processing instructions. The XSLT processor 754 parses the stylesheet file 752 and applies any templates that match the input data. It operates by conditionally selecting nodes in the input tree, transforming them in a number of ways, copying them to the output tree and/or creating new nodes in the output tree.

To transform an input XML vocabulary 750 to another (output) XML vocabulary 756, the XSLT translator processor 754 must parse the transform, parse the source data, walk the two parse trees to apply the transform, and finally output the data into a stream. Because XSLT relies on recursive processing of trees of nodes, where every XML element, attribute or text segment is represented as a node, merely optimizing the implementation of the algorithms will not result in a large performance improvement.

Figure 8B:
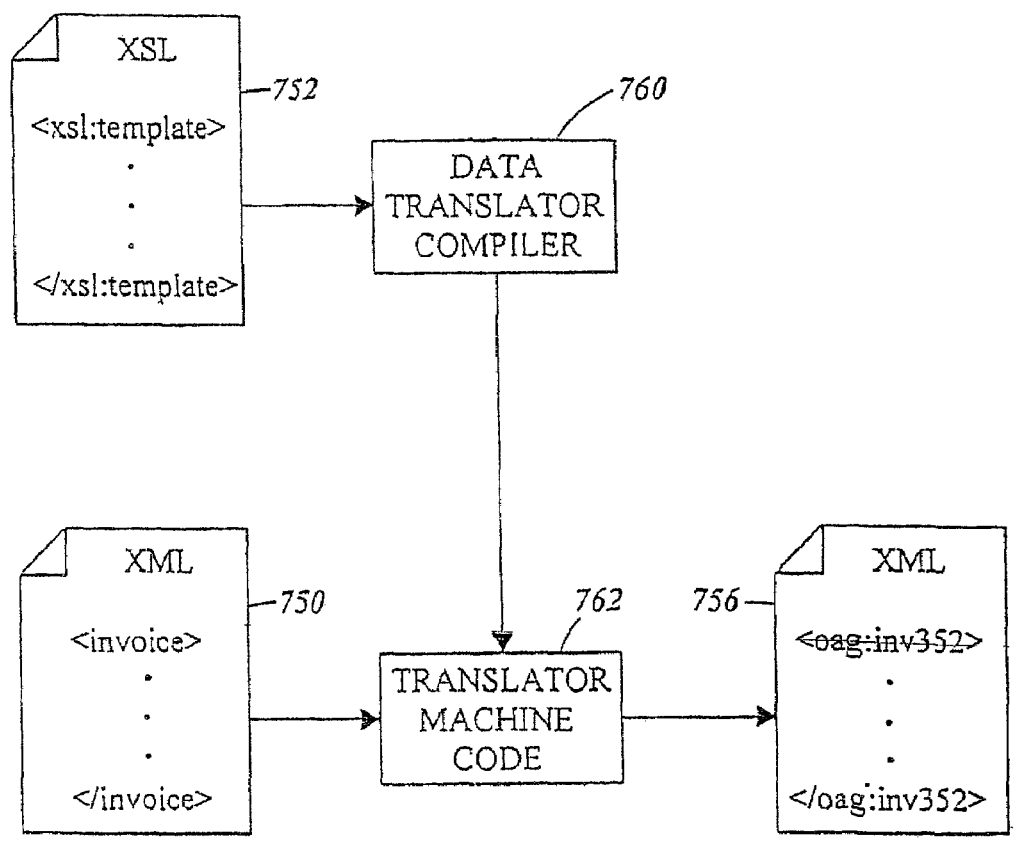
FIG. 8B is a block diagram in which a translator compiler engine and a data translator are implemented according to an illustrative embodiment of the present invention for XSL.

According to an implementation of the present invention, as shown in FIG. 8B, a data translator compiler 760 is adapted for using the XSL stylesheet 752 as its input, in lieu of a source and destination FMRFD. This is possible because the XML format is in a self-describing form. The XSL stylesheet 752 and its constituent templates also provides the necessary DMAP elements. The data translator compiler 760 then generates executable machine code 762 that operates as a run-time translator between the source XML 750 and the target XML 756.

Instead of performing a number of interpreted dispatch operations on three different trees, the CPU in the translator platform simply executes the native instructions (object code) directly and produces the desired output stream. In addition, because so much of the desired transformation is known before the object code is generated, all the generic unnecessary processing steps can be optimized away. Significant performance gains are achieved by generating native processor instructions to make it possible to use XSL in applications where high volumes of real-time data must be processed.

This illustrative embodiment comprises an optimized contiguous memory algorithm, the performance of which approaches that of a memory-to-memory copy utility at speeds that are orders of magnitude faster than a typical XSLT. However, unlike a hardwired optimization, for which the major trade-off is performance versus flexibility, the present invention preserves the flexibility through the use of the FMRFDs derived from the XSL and their corresponding Data Segment Map (DMAP).

Figure 9:
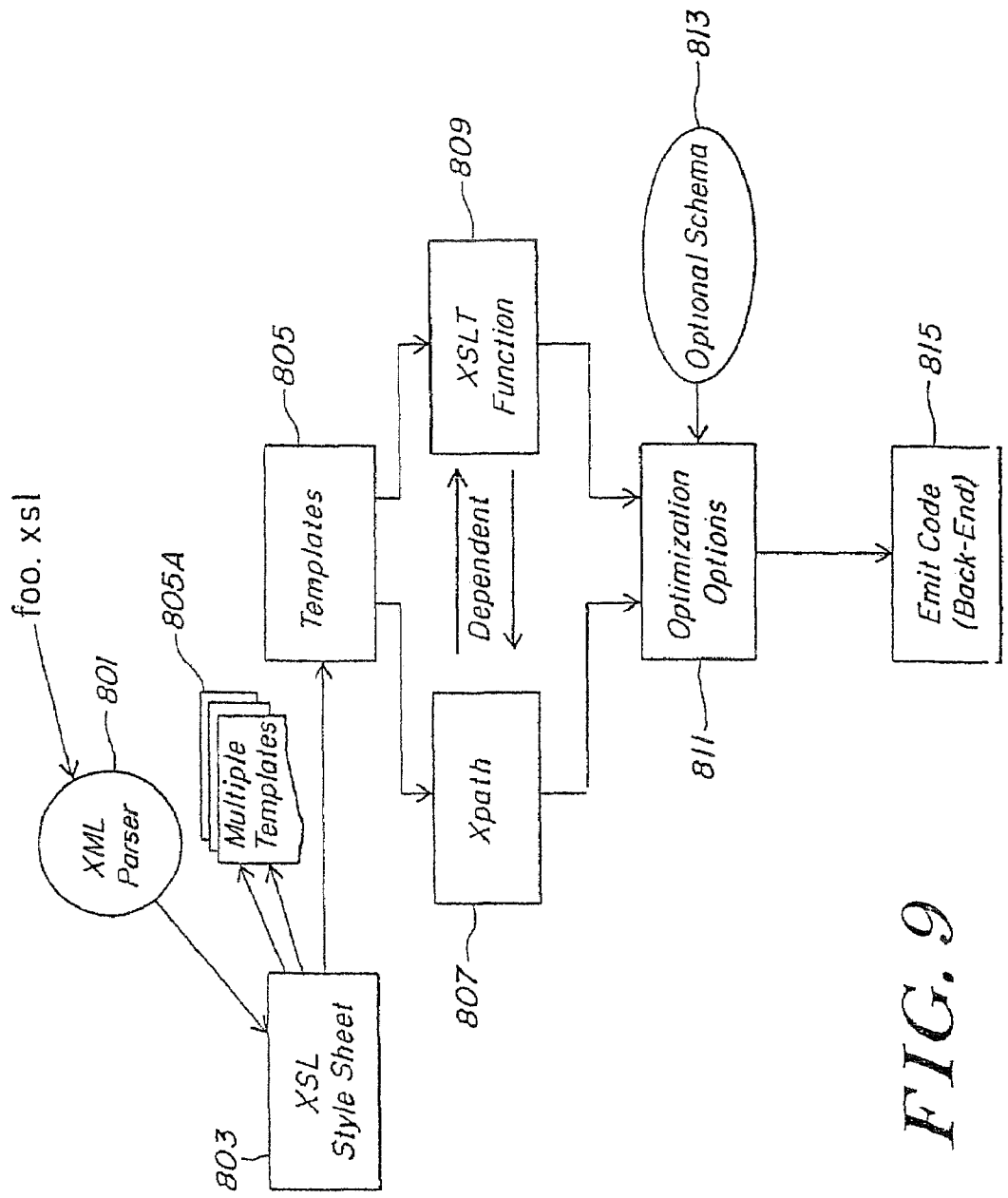
FIG. 9 is a block diagram of a data translator compiler according to an illustrative embodiment for an XSL translator compiler.

There are several overriding design principles that have guided the development of this illustrative embodiment:

1. XSL processing must remain dynamic, so any optimizations should occur at runtime; converting XSL to other programming languages (whether standard or proprietary) during development and then using the result of that conversion is not an option, because it destroys the dynamic flexibility and reconfigurability inherent in XML technologies 2. the data translator should be optimized for cases where the same XSL transform is applied to different data again and again; this is often the case in web application servers and B2B integration, but is less frequent in authoring applications or web browsers; and 3. the ultimate performance targets for both throughput and latency shall be set by the requirements of existing and future applications, not by trying to achieve an incremental improvement over current implementations FIG. 9 diagrams the operation of an implementation of an illustrative embodiment specifically designed for XML translation. An input file such as file foo.xsl is run through an XML parser 801 to generate an XSL stylesheet 803. A number of templates 805, 805A are then spawned from the XSL stylesheet 803, depending upon the occurrences of top-level elements. Each template 805 is then processed by both the XPath functions 807 and the XSLT functions 809 to generate intermediate results comprising a parsed template. Those skilled in the art also recognize that XSLT and XPath are dependent upon each other. The data translator compiler can then either directly emit code 815 or may optionally optimize the intermediate code 811 prior to emitting code 815. Optimization options 811 may also be informed by optional schema 813, as further described below.

Because a given XSL template being processed by the inventive system is not generic, many opportunities for optimization become available. Several of them are especially notable: schema-driven short-circuiting, custom validation, and parse-time validation.

The use of data schemas (such as DTDs, XML Schema, etc.) presents an additional opportunity for XSLT optimization. Because a schema restricts the type, order and layout of data in a particular XML format, it is possible to pre-compute a great deal of the XSL transformation. One example is "schema-driven element access short-circuiting" technique, which is a special case of constraint-propagation. For example, a particular XSL transform uses an XPath expression such as //bar to select and transform all nodes named <bar> anywhere in the document. This would mean that every element in the document may have to be tested to see if it matches. If the schema states that <bar> may appear only as the third element, an optimizing transform processor (implemented according to the present invention) can conclude that any valid source document can only have the <bar> element in that position, and thereby avoid testing any other elements. This can potentially reduce the time to select a node for processing by a factor of N, where N is the total number of nodes in a given tree.

Unfortunately, the schema validation phase itself presents a significant performance challenge. Especially in B2B transactions, it is important to validate the data against the contracted schema, but validation can take several times longer than simply parsing XML. There are two important characteristics of this process that allow for substantial optimizations. First, if validation is being performed and a document fails validation, it can be rejected without further processing being performed. Under these circumstances a system optimized for handling a specific type of XML document need only to be able to process a valid document and gracefully reject any invalid document. Second, many schemas used in e-business data integration (as opposed to documents) are very rigid and relatively simple. For these situations, the validation process is considerably more linear and straightforward than that for the general case.

A validating XML processor can be thought of as a lexer (the XML parser which breaks the input into XML tokens and nodes) and a parser (the XML validator, which verifies that the input complies with the particular syntax dictated by the data dictionary). Traditionally, these steps are combined into a coupled single-pass parser. For example, this is the approach used by the familiar yacc & lex parser-generator tools. The XML parsing and validation passes can be combined, yielding a single custom parser that would parse and validate simultaneously. As with XSL optimizations customized according to the prior art, it is dangerous to make these decisions during development by including hand-written or even machine-generated custom XML parsers into an application. Although limiting the structure and features of XML data handled by the application will improve its performance, it will also destroy the dynamic nature of XML and limit the long-term reliability and maintainability of the application. When the application is a one-off utility tool, this is usually not a problem.

Figure 10:
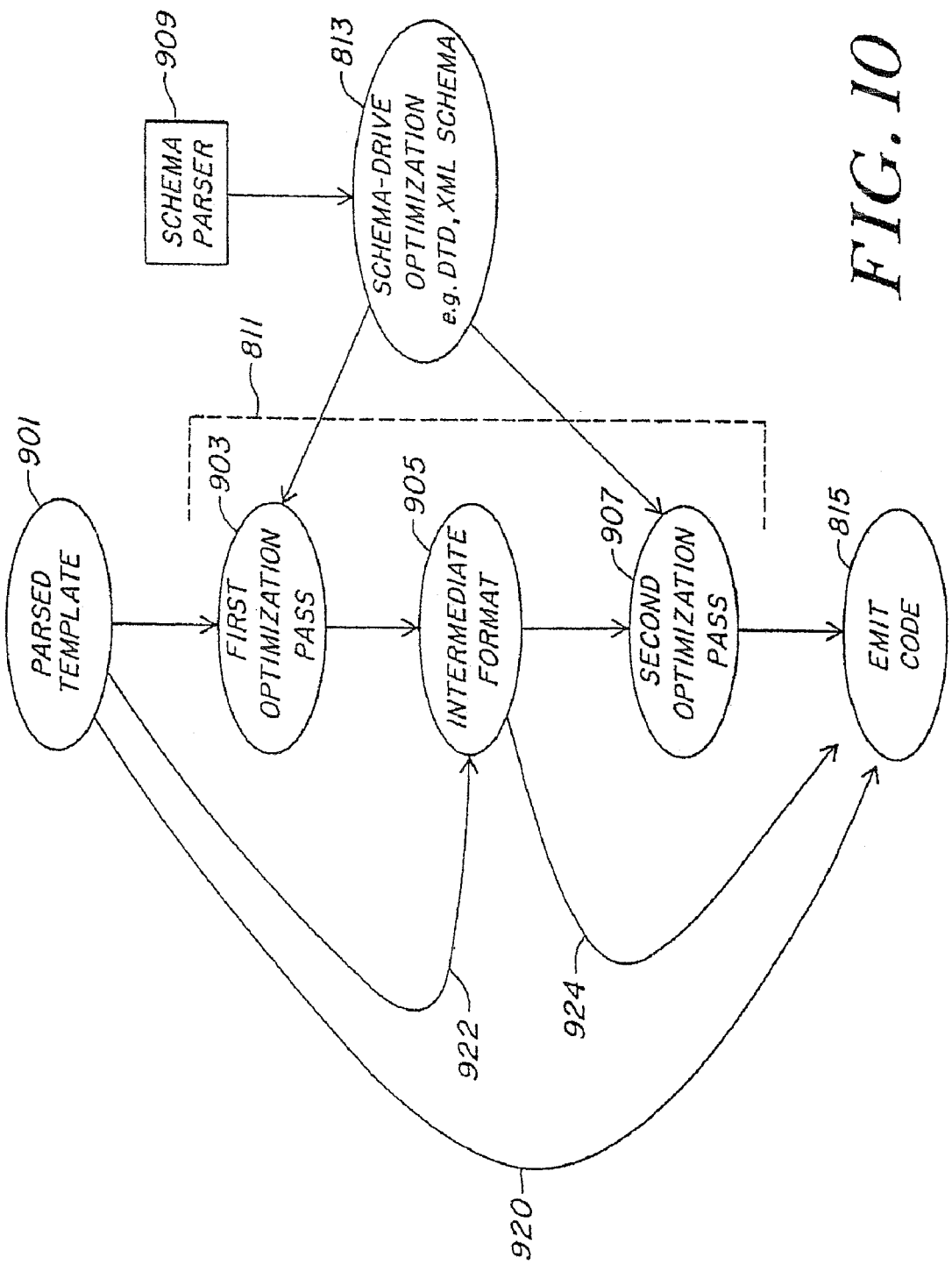
FIG. 10 is a flow chart of representative code optimization options in an embodiment using an optional schema-driven optimization.

FIG. 10 illustrates several possible permutations of optimization according to an illustrative embodiment. The optimization options 811 comprise first optimization pass 901, which generates intermediate format 905, and second optimization pass 907. Either the first optimization pass 903 or the second optimization pass 907 can optionally and independently use schema driven optimization 813.

A parsed template 901 can be used directly to emit code 815 by simply bypassing 920 all optimization. Furthermore, the parsed template 901 may be used to directly generate an intermediate format 905 by bypassing 922 the first optimization pass 903. Similarly, the intermediate format 905 can be used to directly emit code 815 by bypassing 924 second optimization pass 907. If no optimization passes are bypassed, then a parsed template 901 is subjected to a first optimization pass 903 to generate an intermediate format 905 which is further subjected to a second optimization pass 907, before emitting code 815. The necessity or opportunity for optimization depends upon a number of operational factors such as: the requirements of the particular implementation, customer preferences, availability of schema, the detailed content of the available schema, and heuristic benefits analyses.

A schema parser 909 provides the input to the optional schema-driven optimization 813 that can be used in either the first or second optimization passes 903, 907. Examples of such schema include DTD or an XML schema.

But when it comes to business-to-business connections or other important data links, both high-performance and dynamic flexibility must be preserved. Dynamic code generation and binding is able to provide for custom parsers generated at runtime, preserving all of the flexibility of XML and avoiding much of the performance overhead.

Common Subexpression Elimination, or CSE for short, is a classic code optimization method from compiler theory. It is often employed in hand-optimized as well, and is best illustrated by a short example:

$$A=3-(X*B) \rightarrow CS=X*B$$

$$C=6+(X*B)A=3-CS$$

$$C=6+CS$$

In this trivial illustration, the expensive (X*B) computation is eliminated by caching its result in a temporary variable CS, but much more complex optimizations are possible provided that the expression's operands are not modified. Although CSE is a well-known technique, its application to XSLT optimization has not been previously published. The illustrative embodiment uses CSE to avoid repeatedly computing the same selection of nodes or XPath function—instead, the result is computed once and reused throughout the compiled transformation. The studies of XSLT performance bottlenecks have shown that many templates used today repeatedly compute the same node set or XPath function value.

Specific applications of the illustrative embodiment include the following: High-speed XML-to-HTML rendering for application and web servers, XML <--> bXML (WAP) transcoding for wireless and PDA applications, Wirespeed B2B application protocol and business data interchange, and DoS (Denial-of-Service) protection and other security applications The growing number of websites shifting to XML as a publishing and content-management medium drives the need for high-speed XML-to-HTML rendering. With performance on the order of 100 Kbytes/sec., employing a traditional XSLT interpreter on a busy site could easily mean dozens of additional servers to deliver T3 speeds (of 10 Mbits/second). Caching transform output is currently the only approach for reducing the load on either the web server or on the content distribution network. However, more and more web pages are assembled on the fly from a variety of static and dynamic information. Such dynamic pages are unsuitable for prolonged caching, and optimizing dynamic transforms becomes an absolute requirement. A system implementing the illustrative embodiment of the present invention can deliver the necessary performance gains.

The growing role of wireless personal devices (Palm Pilots, cell phones, web tablets and others) means that websites must also convert their content to binary XML-based WAP (Wireless Application Protocol) content. There are great differences in processing, display and connection speeds between wireless devices, which means that custom XSL stylesheets are needed for different devices and service providers. Personalization and dynamic pages are even more prevalent in WAP applications, requiring potentially one XSLT transformation per page per wireless client—an overwhelming burden on even the best servers or WAP gateways. As the number of personal device clients with Internet connectivity grows to millions, the illustrative embodiment enables wireless service and content providers to keep pace.

As more network applications use XML as the means to communicate, there is an increased probability of Denial-of-Service attacks that exploit the very flexibility of XML that makes it popular. Broadly speaking, a typical DoS attack transmits invalid packets to the target host or router, forcing it to expend resources to service the fake requests and thereby degrade or deny service to legitimate requests. The well-known TCP SYN Flood and Unix Process Table Overflow attacks exploit the ability to initiate a connection request without completing it. Other attacks send malformed packets designed to induce the network node to consume processing or bandwidth resources.

In all cases the ability of a content-sensitive switch or server host to stand up to such an attack is based on its ability to quickly reject an invalid packet or connection request. Because parsing and especially validating XML are lengthy operations, it may take much longer to determine that a particular XML-RPC request is invalid than to do so for a binary RPC or TCP packet. Malicious XSL templates can also consume unbounded memory and CPU resources. Therefore, the ability to quickly determine that a particular XML-encoded request is invalid and reject it without any further processing or consumption of resources is absolutely essential to the survivability of a B2B-aware network node or router. The illustrative embodiment delivers fast XML switching and XSL transformation, enabling high-performance protection against a new generation of DoS attacks.

It will be appreciated by those skilled in the art that a translator compiler engine can be configured and optimized for creating native machine code on any target CPU, whether a general purpose processor or a customized processor. Similarly, the translator compiler engine itself can be run on any type of processor, and may be implemented on a platform that is separate and distinct from the data translator. In such circumstances, there would be a communication channel between the translator compiler engine and the processor running the data translator. Furthermore, multiple translator compiler engines can be run simultaneously and make their result available for execution by one or more translators. The translator compiler engine and translator processor may also be operated in a distributed network, although there may be a performance degradation introduced by having to traverse additional communication links with real-time data streams.

As mentioned above, the B2B router may be implemented as an independent unit or as a portion of an existing application server or as a portion of an existing network switch or router. In either case, different functions described herein can be carried out by different processors simultaneously or at different times without detracting from the utility of the invention.

Compiler

XSLT compilation and run-time system embedded in a network appliance in accordance with an illustrative embodiment will now be described. As explained above, XSLT is a way of describing the transformation of XML input data into either XML output data, HTML data, or text. Aspects of the invention allow XSLT to be used to transform to and from binary data, as well. Regardless of the input and output data formats, the goal is the high-speed execution of as many of these transformations in any given time.

The XSLT transformation language is most easily executed using an interpreter. An interpreter would repeated scan a computer representation of the XSLT transformation and perform the computations on the XML data described by the transformation. However that techniques is far too slow for the performance desired. The network appliance needs XSLT transformations to occur at a speed comparable to an assembly program implementing the same algorithm and perform XML processing in a streaming manner, whenever possible. Thus the compilation system of the illustrative embodiment generates IA32, PPC, or SPARC machine instructions directly. Instructions can also be generated for XML-specific processors, such as disclosed in pending patent application Ser. No. 10/883,018 titled METHOD AND APPARATUS FOR PROCESSING MARKUP LANGUAGE INFORMATION, which is fully incorporated herein by reference. It should be clear to those skilled in the art that other types of machine instructions, including abstract machine instructions, can also be generated.

The concept of Just-In-Time compilation is also inadequate for a high-performance network appliance. Just-In-Time compilation indicates that portions of an XSL stylesheet are compiled just before they are needed. This compilation must be fast enough to be unnoticed by the user and provide improved execution performance by providing actual machine instructions to implement the XSL stylesheet. These conditions mean that high optimization levels are not possible with the Just-In-Time compilation.

The illustrative embodiment uses a number of new techniques supplementing the idea of Just-In-Time compilation. These techniques provide the advantages of a highly-optimizing compiler with the amortized speed of Just-In-Time compilation to meet the goals of high-speed execution of XSLT transformations.

A simplified example of the entire network appliance is described here. The network appliance communicates with other network hosts using TCP/IP protocol. When a XML message is read by the network appliance it is transformed by the XSLT program and the result is again broadcast to the network, using the form:

Input-->TCP/IP input-->Transformation-->TCP/IP Output-->Output

The network appliance is a closed system. The XSLT transformation performed on a particular XML data set is determined either by a specification in the data set, protocol from the source of the XML data, or by specifications stored within the network appliance.

Figure 11:
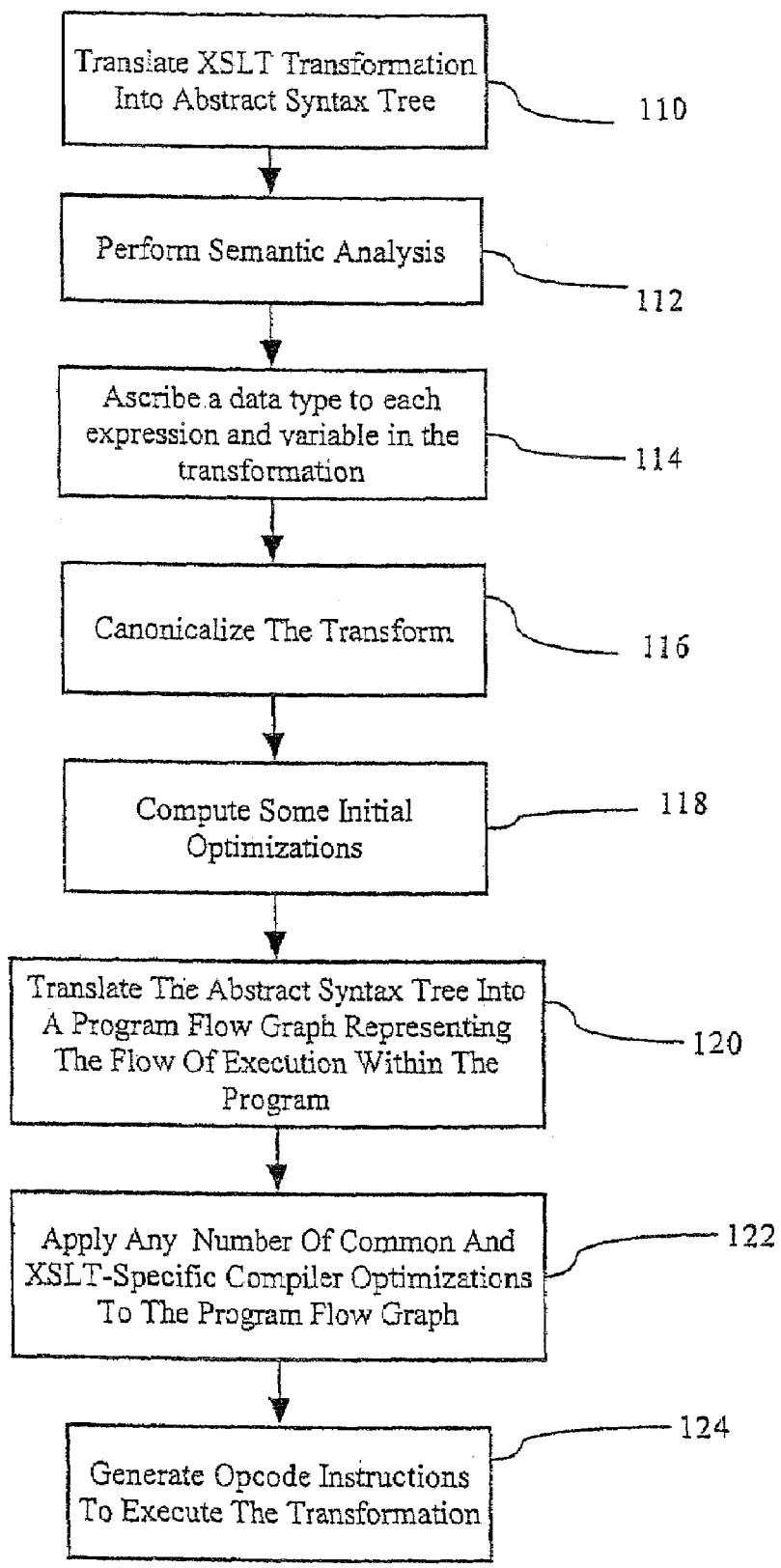
FIG. 11 is a flow chart for steps used by an embodiment of a translator compiler engine.

FIG. 11 provides a flow chart for the major components of the compiler for this illustrative embodiment. For step 110, read the XSLT transformation and translate it into an abstract syntax tree representing the transform. Next step 112 is to check that the transform is consistent with the language rules (semantic analysis). The next step 114 is to ascribe a data type to each expression and variable in the transformation. This step includes optimization in accordance with the present invention.

Continuing with FIG. 11, the next step 116 is to canonicalize the transform so that common idioms are all represented in the same fashion. At this stage it is possible to compute some initial optimizations such as constant folding and common subexpression elimination, step 118. Another step 120 is to translate the abstract syntax tree into a program flow graph representing the flow of execution within the stylesheet or other XML processing control file. At this stage it is possible to apply a number of common and XSLT-specific compiler optimizations to the program flow graph, step 122. Finally, step 124, the compiler generates executable machine instructions, for example IA32, SPARC, or PPC instructions to execute the transformation. Other types of executable machine instructions are also possible, including virtual machine instructions or instructions targeted to configure a programmable logic device (such as FPGA) or instructions targeted to a custom chip adapted for XML processing.

Some of the techniques described are standard compiler techniques known to those skilled in the art, and are as described in Grune et. al. "Modem Compiler Design" or Robert Morgan, "Building an Optimizing compiler". However, the illustrative embodiment includes novel technologies developed to deal with the special features of the XSLT transformation language and its use in network appliances, as will be described hereinafter. Some of these techniques are unique in enabling the use of standard compiler techniques for compiling XSLT/XQuery/XPath/XMLSchema—namely, without applying these aspects of the invention, it would not be possible to make use or benefit from the standard techniques.

Figure 12:
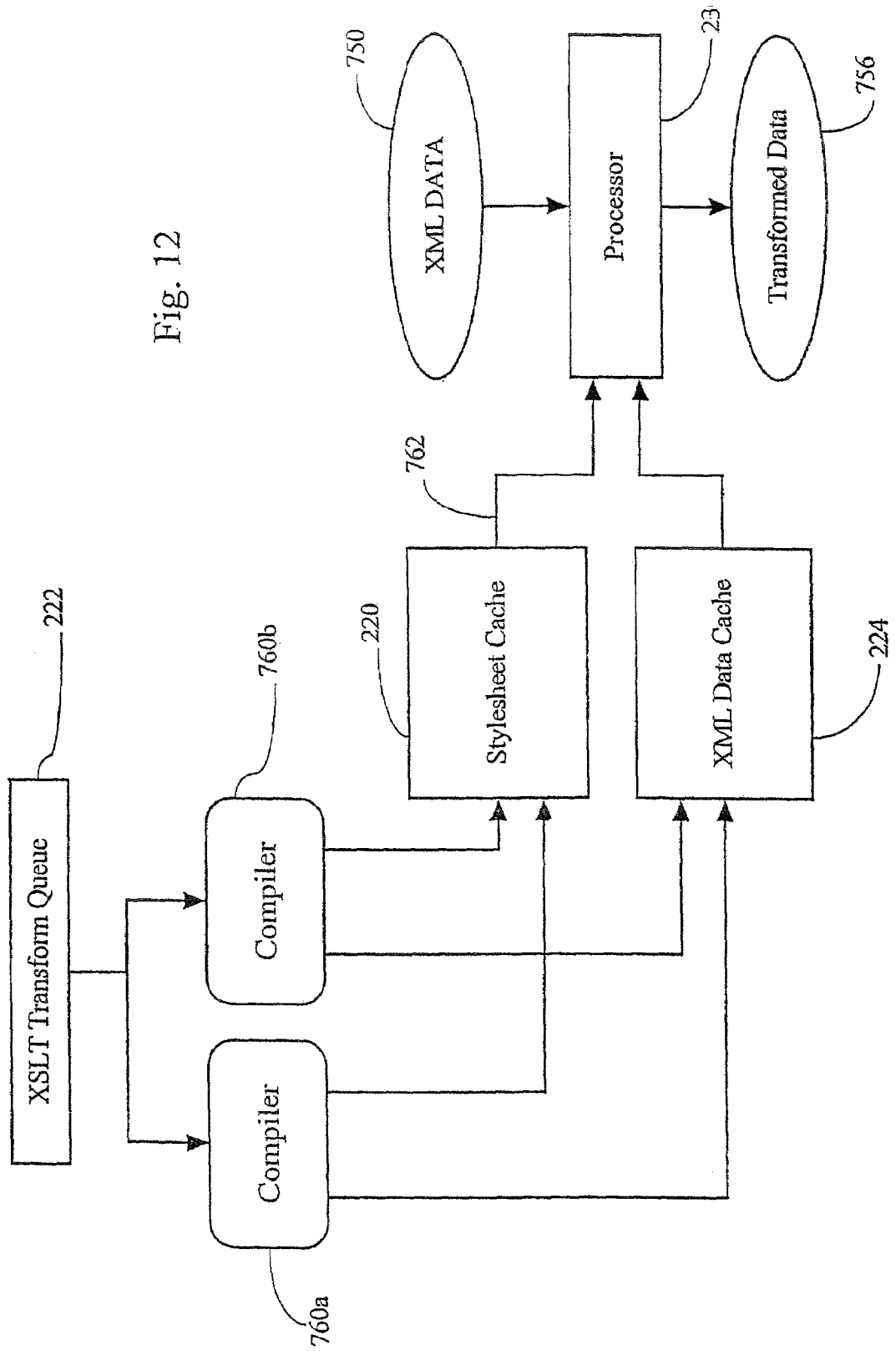
FIG. 12 is a block diagram for alternative setup for maintaining stylesheets for use during runtime conversion.

The network appliance according to the illustrative embodiment performs an optimized compilation of XSLT/XPath to code for the hardware, which in the illustrative embodiment is any type of processor, including but not limited to an IA32, SPARC, or PPC system, abstract machine, specialized processor, cpu, FPGA, emulator (whether in hardware or software), etc. The appliance user expects no delay from the point that the XML message is received until the message is transformed, routed or filtered. This is at odds with the cost of optimized compilation. To amortize the cost of optimized compilation the network appliance maintains a cache of compiled stylesheets, queries or schemas 220 FIG. 12.

Several instances 760a and 760b of the compiler are ready to execute at any time. The illustrative embodiment includes a processor 230, an XSLT Transform Queue 222 and two compiler instances 760, although greater or fewer are easily implemented for the present invention. When a compiled version of the XSLT transform is not found in the stylesheet cache 220, the network appliance adds the URL for XSLT transform to a queue 22 of XSLT transforms waiting to be compiled. Each instance of the compiler 760 repeated removes an transform from this queue and compiles it. By maintaining a status for each transformation, the network appliance delays scheduling the transformation until the compilation is completed. Multiple compilations of the same control file are avoided by marking repeated requests as a duplicate and referencing the pending request.

The stylesheet cache 220 is a fixed-size table, although the size of the table can be changed by the configuration subsystem. The table is keyed by the URI of the stylesheet name and contains as data the executable code for the stylesheet (or any other control file, including XPath expression(s), XML Schema, XQuery, FFD, transformation, etc).

Whenever the network appliance retrieves the name of a stylesheet (from any of the possible sources) it first checks to see if the stylesheet is already compiled. If it is already compiled, then the stylesheet 762 is immediately executed on the XML data 750 to be transformed.

If the stylesheet has not already been compiled, the XML data representing the stylesheet itself is retrieved either using the URI of the name or provided by another component of the network appliance. The stylesheet is compiled using the optimizing compiler described in the rest of this document. The compiler creates two regions of memory. One holds the instructions representing the stylesheet and the other represents the global data associated with the instructions. During translation the compiler stores the instructions and the data in their respective memory areas. After compilation the stylesheet is added to the stylesheet cache 220 and the XML source representing the stylesheet (not the data) is deleted. Thus the only data stored about the stylesheet is the executable instructions and global data.

If the stylesheet cache 220 is full, the least recently used (LRU) entry in the table is removed, the storage is recovered, and the new entry is entered in the table. It is possible (but highly unlikely) that an instance of the stylesheet 762 is executing so the storage cannot be immediately reclaimed. Instead the storage areas are controlled by reference counters and locks. Each time an instance of the stylesheet is used the reference count is atomically incremented. When the instance has finished execution the reference count is decremented. When the stylesheet is added to the stylesheet cache 220 the reference count is incremented. Removal from the stylesheet cache decrements the count. The actual storage is deleted when the reference count is decremented to zero. Immediately before the execution of the style sheet the following actions occur:

(1) A data stack is allocated to store temporary computations
(2) A data heap is allocated to hold dynamically created data
(3) The global data is copied into the data heap
(4) XSLT parameters (which are strings) are bound to parameter variables.
(5) An output stream is created to hold the output of the transformation. The output stream may be of any arbitrary format.

The transformation is THEN performed. After completion all of these data areas are deallocated and returned to free storage.

The network appliance also contains a cache 224 for documents (XML data) as well as stylesheets 220. Many XSLT transformations need a standard set of data to perform the desired transformation. For example, it might need tables of cities and corresponding zip codes. These documents are stored in a cache 224 where they have already been parsed into the tree representing the XML data tree. Aspects of the runtime of the network appliance manage the cache. The cache 224 is a fixed size table indexed by the URL of the document and containing the tree representing the document.

If the table 224 is full when a document is added, the least recently used entry in the tree is discarded and the new entry is added. The documents are reference counted where there is one reference for an entry in the table and one reference for each transformation actively using the document. When the reference count reaches zero, the document is deleted from the system. Note that this means that the document may not be immediately removed from the system when deleted from the table for it might be (unlikely) used by some transformation that is in process.

Turning now to features of compilation optimizations for the illustrative embodiment, one feature relates to cross referencing of the data. XSLT transformations are compiled as multiple walks of the XML data, translating each component of the data into a different form. The commands for describing which parts of the data to walk are called XPath expressions and patterns. Even when transformation are compiled to machine code, for significant quantities of XML data the traversal of the data can be slow. The network appliance and the compiler contain specialized optimizations to improve performance.

The optimization described here is effective when the XPath expression //foo is used in the stylesheet. This XPath expression means walk all of the tree and find all nodes in the XML tree with the name foo. Technically such names are called QNames in XML and XSLT. When compiling the stylesheet the compiler creates a list of Qnames that occur in XPath expressions of this form. These can be used to build an index of nodes associated with QNames of interest. Rather than walking the tree during XSLT execution, the generated code simply looks at the set of names associated with the Qname.

More efficiency is gained in conjunction with the data cache 224 described above. This table is not recomputed if it has already been computed previously in a different use of the XML data. The table is stored in the data cache 224 and reused. In fact the table is incrementally updated. If all of the Qnames needed for the current execution have not been added to the table the efficient tree-walk is used to incrementally add the new needed Qnames to the table. All old entries are maintained and not updated.

This cross reference table is deleted when the XML tree is deleted from the data cache 224.

Type Resolution Optimizations

Another optimization is for type checking. Considerable barriers to performance and extensibility are presented by the lack of explicit typing in XPath and XSLT, and a state-of-the-art implementation of a transformation or query engine would be limited by treating all data fields conservatively as being of "nodeset" or "string" types. To overcome this limitation, during semantic analysis step 112 FIG. 11 the compiler determines the data type for each expression, variable and parameter in the XSLT transformation. The data types are the existing data types in XSLT together with specialized data type for integers (which is not a type in XSLT-1.0 although it is in XSLT-2.0) and a ANY data type which indicates that the actual type of the datum will be known at run-time. This last type is necessary since XSLT was designed without the idea of compilation, hence the type of each datum is not clearly described in the language, and presents a fall-back path for the type resolver.

One difficult part of type determination are organized around variables and template or global parameters. Global parameters have two points of definition: one is outside the transformation where the global parameter might be assigned a string value, the other is within the transform where a default value of any type may be given. If there is no default value for a parameter, the default value is an empty string. For local parameters, there is also an assignment which is the default value and each call to the template associated with the parameter contains an <xsl:with-parameter ...> statement which binds the local parameter of the template to the value computed in the with-parameter statement.

For variables, one issue concerns global variables where the order of evaluation of the global assignment statements might not be determined during the compilation of the transformation.

The type determination algorithm computes two pieces of information: a scalar indication of the type of a datum, and the set of all types that a datum might have. If there is not exactly one type in the set of types then the scalar indication is "ANY".

Type Checking: Step One—Initial Approximation

During semantic analysis, the compiler gives each expression, subexpression, variable and parameter an initial guess of the types that the expression might take. This is accomplished with a depth-first search of the Abstract Syntax Tree (that was created step 110 FIG. 11). After all of the children have been visited, the type of the current node is determined as a function of the types of the operands. This function is dependent on the language specification for XSLT or other type of DMAP/FMRFD definitions being compiled.

When a variable or parameter reference is encountered the reference is given an empty set of data types since the type of the variable/parameter might not be known yet. At the same type a list of all variable/parameter references is computed for later use in type determination.

When a variable or parameter declaration is determined then an estimate for the type of the variable/parameter is given by the data types of the expression assigned to it.

When a <xsl:with-parameter ...> statement is determined the type information for the value assigned to the parameter is merged into the type information for the parameter declaration in the called template.

The assignment of an empty set of types for an unknown variable is intentional. This is an optimistic algorithm which will compute the minimum set of types that a datum might have. The alternative is a pessimistic algorithm which assigns all data types to a variable with unknown type. The problem with the pessimistic algorithm is that later phases may not be able to eliminate impossible data types.

For use in the next step of type determination a work list of all variable/parameter references is formed.

Type Checking: Step Two—Compute Possible Data Types

This step determines the set of types that each datum might have. This is done using the worklist of Abstract Syntax Tree Nodes computed in the previous step.

The basic algorithm consists of (in a loop) removing a node from the worklist. Processing that node and then continuing until there are no nodes left in the worklist.

Processing a variable/parameter reference consists of assigning the reference the same type as the declaration corresponding to the variable. If this changes the set of types associated with the variable then its parent in the abstract syntax tree is added to the worklist.

Processing a variable/parameter declaration consists of adding all of the variable/parameter references to that variable to the worklist. This is done using the cross reference information for each variable/parameter declaration computed in step one.

Processing a normal expression consists of using the types of the operands (one of them has been updated) to determine the type of the expression. If the set of types associated with the expression changed then the parent of that expression is added to the worklist.

Processing a <xsl:with-parameter ...> statement consists of updating the set of types associated with the corresponding parameter in the called template by merging in this set of types. Note that there may be multiple templates that might be called and the corresponding parameter in all of them is updated. If the set of types associated with the parameter declaration in the template changes then the parameter declaration is added to the worklist.

Processing of instructions continues until there is nothing in the worklist. This will terminate since the set of types can only increase. Since the set of types is finite, the algorithm must eventually terminate. In fact it terminates very quickly since most nodes can only generate values for a small number of types. This is among many aspects of the invention that reduce the time required for compilation.

Type Checking: Step 3—Optimizing Parameter Types

The most complex component of type checking is determining the types of parameters from the expressions bound to the parameters by <xsl:with-param ...> statements when templates are called. The situation is made more complicated by a common situation—the parameters of one template are passed (using a <xsl:with-parameter . . . > statement) to parameters of another template. The compiler must determine the types of parameters. This is done by creating a graph.

The type checking mechanism builds a graph (henceforth called the binding graph). The nodes of the graphs are all local or global variables or parameters of a transformation. There is an edge in the graph from a variable/parameter (called the source) to another variable/parameter (called the target) if there is <xsl:with-parameter . . . > statement which indicates that the source is copied to the target. Similarly an edge is inserted for any operation that copies the source to the target.

Tarjan's original strongly connected region algorithm is used to determine the strongly connected regions of the binding graph. All of the variables/parameters in a single strongly connected region in this graph must have the same data types since they are mutually copied from one to the other. Furthermore the algorithm computes the strongly connected in an order which topologically sorts the strongly connected regions, so that variables/parameters that are assigned to are processed before variables/parameters that are the sources of the values. These targets are assigned types first using the following type choice mechanism:

(1) If all uses of a datum involve operands of the same type, then all definitions of the datum are cast to that type.
(2) If all the possible types for a datum are numeric types then the most general numeric type of that set is chosen as the single type for the datum.
(3) If the datum is a node set, node or non-null node, then the most general type is chosen where node set is more general than node or non-null node and node is a more general type than non-null node.
(4) If all of the types can be converted uniquely into a string then use "string" as the data type for the variable.

Most strongly connected regions consist of a single variable/parameter. This is the case when there is no mutual assignment. Furthermore the algorithm for computing strongly connected regions is linear in time providing a swift type determination algorithm. This and other techniques to reduce the time required for generating machine code are helpful to make the invention more useful by reducing the time between the receipt of new configuration and the configuration taking effect.

Following type determination the algorithm inserts cast operations into the abstract syntax tree to make all types explicit for later compilation. If a type can not be determined then typically the variable is compiled to hold a value of type ANY. This involves building a structure at run-time which holds an enumerator indicating the type and fields (overlapping) to hold the value. In order to store the variable at runtime, the generated code sets the enumerator and stores the field. A fetch of the variable involves the generation of code (the equivalent of a switch statement) to check the enumerator and convert the value into the desired type.

In the case of XML processing languages that include type information (such as schema-aware processing of XSLT 2.0 or XQuery), the type resolver process can utilize these as initial starting conditions to further improve runtime performance or speed up compilation by eliminating the need to deduce all of the types.

Sometimes significant performance gains are still precluded by inability to constrain a variable to a single type. This is especially true for numeric variables that may appear to be nodesets or external parameters whose type may vary from one execution to another. In that case the invention allows for template specialization, where individual XSLT templates are compiled with a different set of typing assumptions, and runtime dispatch directs the flow of execution based on the type. The same optimization can be applied at the stylesheet level, for example to optimize the execution of a stylesheet dependant on the type of an incoming parameter.

Implementation of the Evaluate Function

The evaluate function is an extension of the XSLT transformation language to include a function evaluate("XPath Expression"), where the argument is a string representing the source representation of the expression to be evaluated. The string is normally not a constant, rather it is a computed string or a string read from a XML data file. For example, the XML data file could contain strings which represent the XPath expression to apply to the data file to find certain pieces of information—a kind of book mark. In effect, it allows a DMAP or FMRFD to dynamically declare a new FMRFD/DMAP to be used during execution, enhancing both flexibility and ease-of-implementation.

The compiler in the network appliance implements a general form of the evaluate( ) function which is implemented using several techniques provide general XPath evaluation and speed of execution.

When the evaluate( ) function is executed at run-time, the runtime system first checks the stylesheet cache for the current transformation. Attached to the compiled stylesheet in the stylesheet cache is a number of instances of the evaluate function that have already been compiled during some execution of the stylesheet. This table of instances is indexed by the string representing the argument to the evaluation function (i.e. the source text for the XPath expression) and the address in memory of the call to the evaluate function. These two pieces of information uniquely determine a correct translation of the evaluate function (if it has already been translated) into executable machine instructions. If it is not already translated, the compiler is called to translate the string into machine code and the resulting code is stored in the table of evaluate function compilations stored with the stylesheet. If the table is already full, the least recently used instance is deleted from the table and the new entry inserted. All references to this table of compiled instances is controlled by reference counters atomically incremented/decremented. When the reference count reaches zero the storage for the code is reclaimed by the system.

The simplest form of compilation of an evaluate function involves XPath expressions that do not involve any variables/parameters from the executing program. The compiler simply creates the executable code as a function in memory. The entry point for the function is the beginning of the storage region allocated for the function. After the function is added to the table of evaluate functions associated with the stylesheet the function is executed to get the results desired. The argument of the function is the current context in the XML data.

Unfortunately the run-time system cannot tell that the evaluate function does not use variables or parameters without compiling the source string representing the XPath expression. The run-time system and compiler must cooperate to compile and execute the XPath expression irrespective of the use of variables or parameters. The compiler uses a technique which has almost no run-time overhead. In fact much less than the classical state-of-the-art technique of using activation records which must be initialized at point of execution.

During the compilation of the whole transformation (not the evaluate function operand) the compiler makes special preparations for the later execution of the evaluate instruction. It builds a symbol table of all variables that can be referenced at a particular evaluation function call. This includes:

(1) All global variables and parameters
(2) All local parameters
(3) All local variables that are visible at the point of the evaluate function call. This information is used for two purposes. It is used immediately to indicate the conservative observation that any of these variables/parameters might be used in the expression so the optimizing compiler must take this information into effect. Note that execution of the compiled evaluate-function code cannot change any of these variables, only reference them.

The second use of this table is during the compilation of the operand to the evaluate function. That string may indicate that the code must reference one of these variables/parameters. In that case the address information for that variable/parameter is used directly to find the address of the variable on the stack or in global memory. All of the variables/parameters that might be referenced in the XPath expression are allocated to some form of memory to insure that they have a valid address.

With these mechanisms added to the compilation process, the compilation of the XPath expression is straight-forward. It is passed to the compiler as input. The compiler compiles it using the standard structure. The compiler can be configured to avoid some optimization passes to speed the compilation. After compilation and addition to the stylesheet table of previously compiled XPath expressions, the function is executed with the current context as it single parameter. The result returned is the node set of nodes which satisfy the XPath expression.

Of course, it is important to note that dynamic XPath expressions can also be compiled by the embodiment outside the XSLT context (e.g. standalone, or inside XQuery or XML Digital Signature), but these are either simpler—because there is no need to keep track of the possible context of the XPath expression—or are similar to the process outlined above.

Profiling and Debugging

The compiler and the run-time system have the ability to insert profiling features into the generated machine code. This makes very detailed profiling results available to both the end-user and the system internals without introducing any additional overhead to normal execution of XML processing—an important advantage of dynamic code generation. Profiling can be automatic or controlled explicitly, for example enabled only for a specific XSLT template, a specific XML schema constraint or portions of XPath expression. This makes it practical to enable profiling of a generated translator even in production systems by limiting its resource overheads. The compiled code caching system (e.g. "stylesheet cache") can include both profiling-enabled and normal-mode versions of a given stylesheet, and the user can switch between them. The profiling results can also be fed back into the compiler and used as optimization hints for subsequent compilations.

A related feature is the built-in debugger enabled by the compiler and the runtime system. If enabled, it also inserts executable machine code instructions into the resulting translator, and allows the user to pause a running transformation, set breakpoints, and trace the value of individual variables. Here, again, the user can have multiple versions of the compiled code cached, and never has to pay the performance cost of debugging unless it is enabled for the specific XML processing definition. As with traditional debugging, some optimizations may be disabled to improve the clarity of debugging output.

Determining Order of Evaluation of Global Variables/Parameters and Lazy Evaluation.

The run-time system within the network appliance has an optimized system for referencing variables and parameters. For variables and parameters local to a template or function there is no problem. The order of the statements defining the variables and parameters are the order the expression values are evaluated in. The problem is with global variables and parameters. The order that they occur in the XSLT transformation is not significant. The executable code must guarantee that they are evaluated before the first reference to the variable or parameter. The compiler uses two techniques for guaranteeing this order efficiently.

The general mechanism implements lazy evaluation of global variables and parameters. Associated with each lazy global variable or parameter are three fields of a structure:

(1) A status field indicating: uninitialized, initializing, initialized.
(2) The address of a generated function to evaluate the value
(3) The value (If it is has status: initialized).

An XSLT variable is initialized only once, and the value cannot be changed. (Although the appliances allow special extensions to make changeable variables possible). All lazy global variables and parameters created with a status of uninitialized and the compiler generates a function whose execution will compute the corresponding value. When a variable to a lazy variable occurs the generated code implements the following operations:

(1) Check the status: if it is initializing then there is a runtime error indicating that there is circular dependence of variable on self.
(2) If the status is uninitialized, then mark its status as initializing and call the corresponding function to determine its value. After the function has completed execution the status is changed to initialized and the value is stored in the value component of the lazy structure.
(3) If the status is initialized, then the value is directly loaded and used.

The compiler determines the order of evaluation of global variables and determines which global variables/parameters are lazy using the following algorithm. The compiler builds the global variable graph. The nodes of this graph are all global variables and parameters. There is an edge between two nodes (variables/parameters) if the first variable occurs as an operand in the expressions representing the value of the second. Then the Tarjan strongly connected region algorithm is applied. The algorithm computes two pieces of information: it gives the sets of mutually dependent variables and it topologically sorts the variables so that variables that are used in the expressions for other variables occur earlier in the list and thus will be evaluated first.

There are three techniques for determining when one variable might be an operand of the expression evaluating another variable:

(1) If the variable occurs directly in the expression.
(2) If an evaluate expression occurs in the XPath expression for the second variable, then the compiler assumes that all global variables might be an operand of this expression.
(3) If the XPath expression for the second variable involves any functions or XPath expressions that are too complex to analyze easily.

All of the variables that occur in strongly connected regions are implemented as lazy variables so their values will be evaluated the first time they are used. If they cannot be evaluated at that point then it is a run-time error that terminates execution. All of the other variables are sorted in the order given by the topological sort: variables earlier in the list are used in the expressions of variables later in the list. These variables are implemented without the overhead of lazy variables. The instructions for evaluating these expressions are generated into the initialization code for the XSLT transformation.

Push Parsing

The real-time nature of the network device requires new techniques for translating the XML data source into the XML tree or a list of actions that represent the tree. New techniques are needed because the parser cannot request the reading of the next buffer of data when a buffer is needed. Instead the parser must be ready to parse a buffer of data whenever the data arrives over the network. The classical parsing technique is called "Pull Parsing" because the parser requests (i.e. pulls) the data from the system. This technique is called "Push Parsing" since the data is pushed by the system into the parser whenever a message arrives. This section describes new techniques for structuring an XML parser to support push parsing.

The classic "pull parsing" parser is a recursive descent parser. The structure of this parser is a set of mutually recursive routines. Within each routine a subroutine is called to get the next token. That subroutine hides the buffering of the data. If there is not enough data in the buffer then an I/O operation is performed to read the next buffer. This does not work well in a network appliance since it would require that each XML processing run in a separate system thread. Since there is simultaneous processing of a large number of messages in the network appliance the storage and operating system costs would be prohibitive. The problem is the nesting of the I/O operation within the recursive subroutines.

The push-parser is structured so that the parser is terminated at the end of a buffer returning an indicator describing whether the parse has completed or more data is needed. Associated with this indicator is a data structure which holds the whole description of the current state of the parse. This includes:

(1) The stack of XML nodes that have been started including the name of the node and a pointer to the node in the tree.
(2) All data that is computed before some attempt to read a character and is used after the attempt to read a character.
(3) An indicator of where in the code to continue parsing when a buffer arrives. In our system, the indicator is an integer. Each request for the next character is assigned a number. The number 0 indicates the start of parsing. The other reads of a character are assigned integer values, starting at 1.

For the push-parser to work, there must be no subroutines that directly or indirectly gets the next character in the buffer. All attempts to read the character must occur directly in the main parse routine.

In one illustrative embodiment, the parser is structured as a large C (or C++) switch statement:

```
int parser(char last_character, int indicator, environment )
{
    char ch = last_character;
    restore environment
    switch (indicator) {
```

-continued

```
        case 0:
            initialize data and fall through to case 1
            beginning of parse
        ...
        }
    end_of_buffer:
        save environment
        return NEED_MORE_INPUT;
    }
```

To make the parser readable there is a standard GETCHAR macro defined which checks to see if there is another character in the buffer. The check for another character is optimized by previously removing the last character from the buffer (saving it in the environment) and putting an null character in its place. Thus the check for end of buffer becomes a check for null character. The following macros are used to get the next character to make the parser readable. The parser reads as if it were the pull-parser except the macros save all of the state and restore it.

```
#define NEXT_CHAR(lab) { if ('\0' == (ch = *pos++))
    WAITCHAR(lab) }
#define WAITCHAR(lab)              \
    {                              \
        parser->bufstate.last_state = lab;   \
        goto end_of_buffer;        \
    case lab:;                     \
    }
```

The WAITCHAR macro hides all of the push-parsing code. It saves the label to branch to on entry into the environment for the parser and goes to the standard end_of_buffer point in the parser. That point saves all data that might be in use (that is live across the switch label). The semantics of C and C++ allow these labels to be nested in arbitrary statements (but not in other subroutines). The NEXT_CHAR macro loads the next character into the universal character holder, ch, at the same time incrementing the pointer. If a null character is returned the parser is left. When the parser is reentered the next unprocessed character is fed in as an argument and copied into ch so the WAITCHAR macro looks like it did nothing except get another buffer.

Streaming XML Processing

Now the process of allowing streaming XML processing will be described. XSLT/XQuery and XPath were designed with a "DOM tree model" in mind, as described above. Just like they were not designed to allow compilation, they were not designed for streaming, either, and the present invention enables compilation and streaming. Whether it's XSLT, XPath, FMRFD, DMAP, XML Schema, XQuery, or some yet-unknown format-definition-and/or-transformation definition, the present invention enables streaming processing in optimal and heretofore impossible ways.

A simple XPath expression can unknowingly introduce all manner of hazards for a streaming engine. For example, "string(a[b]/c)" is a simple XPath expression which selects the string value of an element named "c" with a sibling named "b" that is the child of an element named "a". Note that the XPath expression provides no information about the relative ordering of the 'c' or 'b' children of 'a'. This expression might be used to select nodes from an XML document looking like this:

```
<a>
    <b>Node b</b>
    <c>Node c</c>
</a>
or perhaps like this:
<a>
    <c>Node c</c>
    <b>Node b</b>
</a>
```

When using a (DOM-style) tree, the two cases are virtually identical. To evaluate the XPath expression, one simply examines the children of the 'a' element to ensure that there is a child named 'b', and then look for the child named 'c'. To a streaming processor, however, they are very different. Remember that a streaming processor must process the data as it arrives: meaning that in the second case, it must process the 'c' element before it knows whether it has a 'b' sibling or not. This kind of processing is called speculative processing.

There are other pitfalls as well: XSLT transformations commonly walk the same tree nodes many times, extracting different data for different purposes. In a DOM-style XML tree, this is easily done. When streaming, however, once the data has been consumed it is gone: while it would be possible to save it, that would be tantamount to building the XML tree in the first place.

It is often possible to avoid walking the XML tree many times by simply performing all three tasks that one must perform at the same time. However, this is not always convenient. For example, suppose that there were an XML tree similar to the example tree above and that the transformation in question walked over the children of the 'a' element twice: once to print each 'b' node, and once to print each 'c' node. Because all the 'b' nodes must appear before the 'c' nodes, it is difficult to process the children of 'a' only once. When a given 'c' element arrives, it is not known whether more 'b' siblings will follow.

In other cases the problem is simply that the transformation results in an explosive number of states. Most XSLT translations (or other similar FMRFDs) are very input-driven; that is, the protocol is very flexible and can do a great number of things depending on the input. While convenient for the stylesheet author, this kind of flexibility can cause great difficult for compilers trying to analyze execution flow. (Again, the recurring theme is that great innovation is required to provide flexibility without sacrificing performance, and vice-versa). Typically, when merging several pieces of a program that want to examine one piece of data, a compiler would create a finite state machine that allowed each of the pieces of the program to execute simultaneously. Unfortunately, in XSLT trying to track how many pieces of the transformation might be examining a given element at compile time is very difficult.

Figure 13:
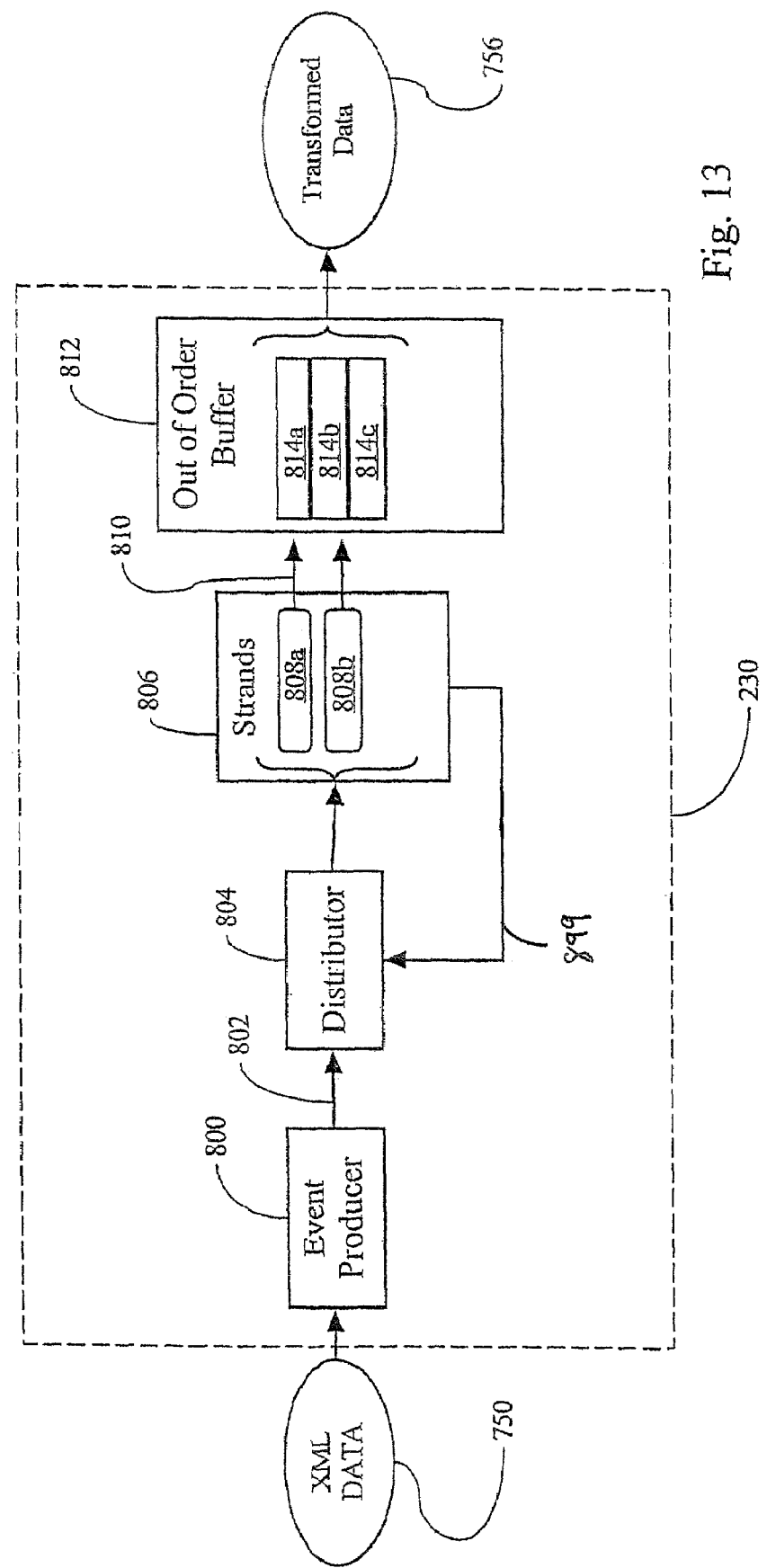
FIG. 13 is a block diagram showing steps performed by one embodiment to allow streaming processing of data.

To overcome those challenges, the present invention utilizes a process referred to as "streaming runtime". According to an illustrative embodiment, the runtime begins with an event producer 800 FIG. 13. This is commonly an XML parser, but it can be any other source of XML events, such as another XSLT process, XML schema validation, XML encryption, routing step, etc. The event producer 800 sends events 802 one at a time. These events 802 are received by the distributor 804. The distributor 804 receives parse events and sends them to a collection of active strands 808. Strands 808 are independent fragments of a program, typically running in parallel similar to threads. Each strand 808 represents some XML processing; as the strands consume the events 802, they produce output 810 (the result of the transform). Using an out of order buffer 812, this output eventually makes its way to the output stream 756. These components will be described in more detail below.

Parser/Event Producer

A brief introduction to SAX parse events is helpful. For an XML tree like the following:

```
<a>
    <b>node b</b>
    <c>node c</c>
</a>
```

A SAX parser would produce a series of eight events (actually, depending on the configuration some parsers might produce more or less, but this will serve for demonstration purposes) that are very similar to those of a standard tokenizer. The events a SAX parser can produce are of the following general types:

Start Element: Indicates a tag like <b> was found. Includes the attributes, if any. Until the corresponding End Element event is received, any events indicate descendants of the element described in this event.

End Element: Indicates a tag like </b> was found. Terminates the corresponding element.

Character Data: Indicates text, like "node b", was found. Typically character data can come in multiple chunks. So, the string "node b" might actually be transmitted in two events: one that contains "node" and one containing "b", for example.

There are more events for structures like comments, processing instructions, and other parts of the XML specification.

The illustrative embodiment uses a modified API (application program interface) to communicate parse events. It is superficially similar to SAX, but allows the event receiver a great deal more flexibility and control regarding which events are sent and where they are sent. In addition, it is built in a layered fashion: there is a core API which all producers and receivers must support. On top of the core, there are a set of optional hints that may be provided which can be safely ignored. This allows the system to invest a lot of effort optimizing, say, the main parser through the use of extensive hints, while still allowing other code to produce events in a simpler fashion without having to be kept up to date with the latest hints and tweaks.

There are two fundamental structures to the API: the Event structure, and the Handlers structure. The Event structure represents a single parse event and all the data associated with it. Each event contains all possible fields for all possible events, but only the relevant fields for the type of event (start element, character data, etc) will be filled in with valid data and not others. In addition to the typical SAX-style information, the event structure also stores the names and attributes of all ancestor elements to the current event. The reason for including these in the event is described below. The Handlers structure is exported by each entity receiving parse events: it describes to the parse event producer where to send the events being produced as well as providing hints about what kind of events would be welcome.

The core of the Handlers structure is an array of function pointers, one for each type of event. Each points to a function which takes as its argument a parse event. When the parser has produced an event of a given type, it lookups up the appropriate handler in the array and calls it with the event structure.

It is possible for the receiver to use the same function for each type of event, as the event structure can be inspected when it is received. Alternatively, the receiver could use different event handlers for each type of event. In addition, a receiver can simply store a NULL pointer in the array, indicating that it has no desire to receive events of a given type.

Each handler function also returns a code. There are three core codes: OK, Error, and Interrupt. The OK code simply indicates the event was processed and the receiver is ready for the next event. The Error code indicates a fatal error occurred and no more events should be sent. The Interrupt code indicates that the producer should interrupt before sending the next event; eventually, when parsing is resumed, the next event will be re-sent. This last code is used when the handler receiving events encounters some sort of situation that causes it to block before allowing further processing: one example would be schema validation. If a document declares itself valid according to a schema, the handler may need to go fetch and prepare the schema before continuing parsing so that the document can be properly validated.

In addition, the handler may return the code Skip. This is a "hint" code and can be treated as OK by the producer if desired. If the producer does honor the skip, then it should not send any further events until the end element corresponding to the most recently sent open element is received: basically, this skips the remainder of the subtree.

The combination of the Skip code and NULL handlers provide for the basic hints available to the handler. However, these two are often insufficient to properly tune the parse events. In implementation it has been found that the overhead of receiving events that are of no interest to a handler can be quite high, and as a result more mechanisms have been created for fine tuning the events received.

One useful technique is that the handler can export a list of element names of interest: before a start element event is sent, the parser looks up the name in this list to decide whether or not to send the event. The exported list must be sorted and properly formatted for fast lookup.

In addition, the handler can control end element events by depth: it can indicate that it has no interest in receiving end element events until the tree's depth gets low enough. This allows the illustrative embodiment to search within a subtree for an event and be notified via an end element event when it has exited the subtree without receiving events for all the items within the subtree.

One side effect of these advanced hinting options is that the parser typically needs to include the ancestry for each event. This is because it is not possible for the handler to know the ancestry of a given event since it may well have used hints to the parser to avoid receiving notification of the parent events. This can be very useful when, for example, scanning for a match to a pattern. If the system is looking for all nodes that match the pattern "a/b/c" in a document, it can simply disable parse events except for start elements named 'c', and then check that it has a 'b' parent and 'a' grandparent. This is much more efficient in practice than receiving the intermediate events.

Strands

As previously described, a strand 808a, 808b is an execution path of co-routine calls. Strands 808a, 808b may be processed in parallel, including on separate hardware processors, however strands may also be processed by a single processor or process. Strands 808a, 808b can spawn other strands. This requires the name of a co-routine together with arguments that are needed. One of these arguments is the parser event 802, there may be others. Spawning a strand 802 means registering the strand 802 with the distributor (as shown by arrow 899) so that all events 802 will be passed to the strand and also it means executing the coroutine that is called to start the strand.

Strands 808 typically cannot be terminated externally and do not have the typical set of parallel processing primitives such as the ability to wait on one another. (Alternative embodiments that utilize separate processing cores acting in parallel to execute the strands would naturally add some of the primitives. However, it is important to note that in all cases, the strand structure greatly reduces the requirement for such synchronizations, bringing considerable benefits). When a strand 808 is spawned it is registered with the distributor 804. When each parse event 802 is received, the distributor 804 loops over all active strands 808 and feeds them the next event 802. Each strand 808 then executes until it is ready for the next event; requesting the next event causes the strand to suspend itself and allows the distributor 804 to feed the other strands 808 the current event 802. Once all strands have received the current event, the event producer 800 is allowed to proceed and produce the next event which is then fed to all strands 808 in turn. If, after receiving an event, a given strand 808 terminates without requesting another event it is removed from the list 806.

Rather than add synchronization primitives so that strands can wait for one another, the illustrative embodiment instead requires strands 808 to deal with the entirety of the input subtree at the point where it is spawned and nothing else. This means that the spawning strand 808 can simply wait until the subtree for which the new strand was spawned has been consumed and then it is assured that the new strand has terminated.

Note that there is one strand 808 which is spawned at the beginning of execution. The strand starts execution of the initialization template which is given a context which is the root of the tree.

The number of strands 808 that are used is not known at compile time and depends upon the input document 750 and the path taken through the XSLT transformation. Since the strands 808 are processing events in parallel, this helps to deal with the problem of an exploding number of states described above.

As each strand adds a small amount of overhead to the system, the compiler takes some efforts to avoid creating more than necessary. However, strands provide a very useful method for handling many situations.

Distributor

The distributor 804 is what stands between the parser/producer 800 and the strands 808 which contain the program logic. It is part of the runtime process and is essentially a library routine, meaning that it does not vary from transformation to transformation definitions.

The distributor 804 contains at all times a list of active strands 808 which are always waiting upon the next parse event. When a parse event 802 is received, it is given to each strand 808 in turn as described above.

The distributor 804 also has certain special modes: it can, for example, skip a subtree or find its string value (the concatenation of all text nodes) very efficiently. Generally, strands 808 may handle these tasks themselves, but if there is only one strand 808, it can request the distributor 804 to do the task more efficiently since it avoids the overhead of invoking the strand 808. In fact, in some cases the distributor 804 can actually communicate back to the parser/producer 800 and avoid the overhead of invoking the distributor at all.

The distributor 804 also tracks a small amount of state. For example, it remembers the stack of start element events so the names and attributes of all ancestors of the current start element are known. This can be done with very little overhead because the particular SAX-like parse event API ensures that the strings will remain valid so that they need not be copied.

Out of Order Output

One of the challenges of streaming is handling the fact that data does not always arrive when the system is ready for it. In fact, due to the nature of XSLT/XPath and XML, it is often the case that data may arrive in a convenient order, but that cannot be guaranteed. (This is not unique to FRMFDs associated with XML processing, but is similar to challenges in processing ASN.1 SET or SET OF notation, so an embodiment of the invention can applied for processing non-XML data, as well). The tree-based processing model solution to this problem is to buffer all of the data so it is always available. The present invention provides the solution instead to allow the results to be generated out of order.

As previously described, an example was given of an XML processing program (often expressed in XSLT) which printed all of the children named "b" before all of the children named "c". At first glance, this seems like a very hard problem to do in a streaming program because there may well be "c" children before all of the "b" children have arrived, meaning that the values of the "c" children would need to be saved.

Using the out of order buffer 812 alleviates this problem. The out of order buffer 812 allows the creation of special streams which can be interrupted. Interrupting a stream A produces a second stream A'; all output to A' is guaranteed to appear before A in the final result. Only when A' is destroyed will the output from A begin to appear in the final result.

To handle the example above, then, the system simply outputs the "b" children to the stream A' and the "c" children to the stream A as they come. When all the children have been consumed, A' is destroyed and the final output appears in the right order. The basic unit of this out of order buffer 812 is the dpStream. It represents data which is eventually sent to output 756. The out of order buffer 812 contains a list of dpStreams (814*a*, 814*b*, 814*c*) which are to be output in order. Each dpStream is output when it is completed (see 'unhold' operation below) and all preceding streams have been output. The place is the list of dpStreams is determined by an "interrupt" function which inserts a stream before the current entry in the list. Note that the data for the stream has not yet been inserted. The routine 'unhold' is a signal to the library that the particular output stream has been completed. It now becomes available for output. If that output stream is the first output stream in the list of output streams it can be directly output to actual output. Otherwise it remains buffered until all preceding output streams have been sent to output.

The second component of out-of-order evaluation of data is the need to evaluate an XPath expression once while using its value multiple times. This extends the compiler's ability to generate a string as the output from a dpStream. This is used here (so that all processing of nodes generates dpStreams). However, for each string dpStream one must keep track of a number of other streams which this string must be copied to. There are init routines to handle this process:

dpInitDefer(datum) This is a signal that the datum is used with deferred evaluation. It initializes the waiting list to empty and signals that the value is not yet computed.

dpAddStream(datum,stream) This function adds 'stream' to the set of streams that need the value of the 'datum' copied to it when the value becomes available. If the value is already available the copy is made immediately, otherwise the stream is placed on a list of waiting streams. When the value is copied the function 'unhold' is applied to the stream so the value is ready for output.

dpCompleteValue(datum,value) This function signals that the value of the datum has been computed. The type of the value must be a string and it is copied to each of the streams waiting for the value and is used as value for any future references to dpAddStream(datum,stream).

dpFreeDefer(datum) Release the storage and data associated with the datum. This is called when there are no possible future uses of the datum to free the storage associated with the datum.

Out of Order XML Output

The previous section discussed out of order output in terms of generic byte streams. There is another complication as well: XML processing in general and XSLT transformations specifically do not output byte streams. They actually generate XML trees which (generally) are serialized on the spot by the XML processing engine into an XML stream.

What this means is that XSL transforms generate a series of events similar to parse events to describe the XML tree being output. For example, if the result of an XSL transform were the tree: "<a att="v">text</a>", they might generate something like:

```
0 START EL a "<a"
1 START ATT att " att='"
2 TEXT v "v"
3 END ATT a "'"
4 TEXT text ">text"
5 END EL a "</a>"
```

The text outputted for each event is included.

Normally it is fairly straightforward to serialize this into a byte stream on the fly. Notice, for example, that the event which outputs the body of the element (event #4) also closes the element's start tag; this is because until that event is received the user has the option of generating more attributes, depending on what the transformation does. The parts of the transformation that convert these output events into byte streams are called output handlers.

In the out of order case, however, things become a little trickier. The above stream of events could be received by any number of handlers, each outputting to a different place in the final result. In addition they may be received out of order. For example, event #2 might be received by an interrupted handler as the first event it has seen since its creation. Therefore it might not know whether that text is the body of an element or the text of an attribute. Likewise, the stream receiving event #4 might not know that it needs to output the closing '>' of the start tag.

The illustrative embodiment solves this problem by having a special state for an interrupted output handler—when an output handler is interrupted, it does not know what will eventually be output before it, so it goes into this state designated "Interrupted." When in this state it is very conservative about what it outputs, and in addition it remembers the first output event it receives. So, if a handler A was interrupted and received Event #4 above, it would remember that it received a Text event.

When the handler A' that appears before A is released, and thus the system knows that no more data will be output to it, its state is reconciled with the handler A which follows it. In this case, A' will know that it contains an open start tag, and since A started with a Text event, it will know that a closing '>' is needed.

For the most part, it is impossible to write an XSLT transformation or translation to generate invalid XML. For example, the output handler need not worry that start and end tags will not match. These properties are guaranteed by the language. However, there are certain errors that can still occur—for example, the user could attempt to generate an attribute after the start tag for an element has been closed. Or, they could generate two attributes with the same name. In most cases, these kinds of errors are not reparable in a streaming context. However, the XSLT specification allows a processor to abort the transformation if the user commits one of these errors, and they are detectable, so that's typically what is done. The only exception to this is duplicate attributes, which must be handled by actually detecting them and rewriting the serialized text on the fly.

Note finally that is also possible to output in XSLT to other targets besides serialized byte streams; for example, those output events might be used to build a XML tree, or fed into a subsequent Distributor for the next step of processing In this way multiple XML processing actions can be chained together efficiently, for example: XML push parse, streaming XML schema validation, WS-Security XML encryption, XPath routing step, final general-purpose XSLT transformation followed by direct output of a modified XML bytestream to the network. Depending on the type and position of a processing step and whether it is streamable, its inputs and outputs may be trees, event streams, byte streams or other constructs.

Compile Time Techniques

The preceding section dealt with the runtime tools available. Equally important, however, is the compile time analysis that is used to examine the XSLT. The streaming compiler builds upon existing non-streaming XSLT (or other similar FMRFDs) compiler techniques as previously described. Three new components are included for streaming ability.

Figure 14:
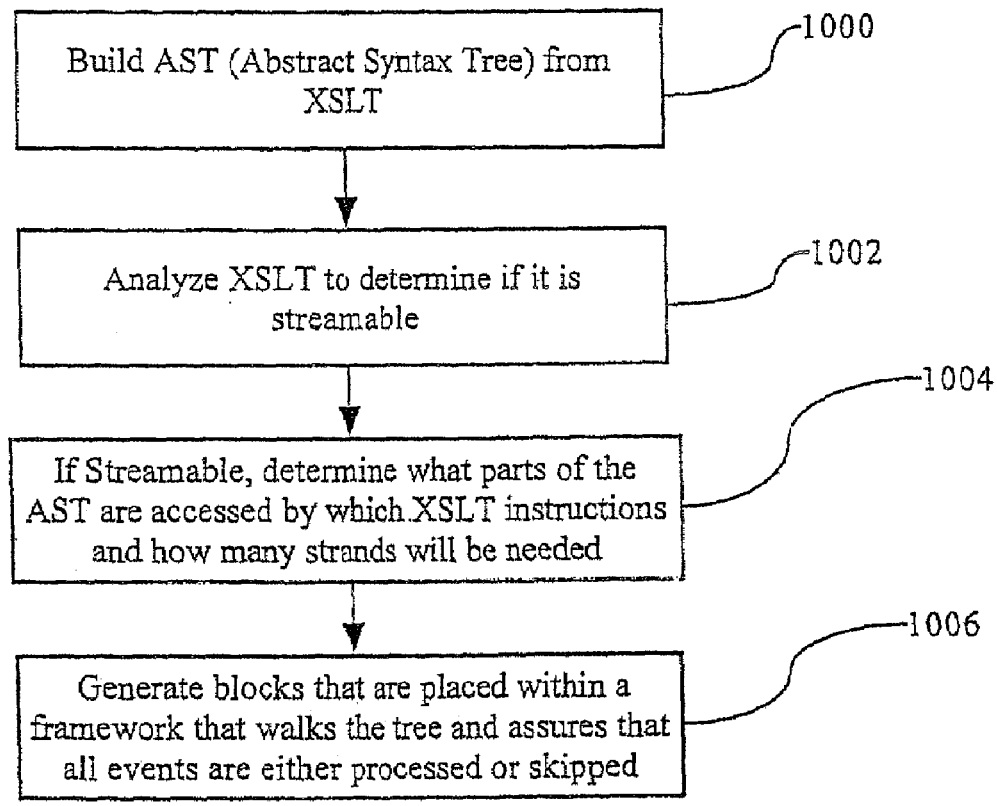
FIG. 14 is a flow chart of steps used by one embodiment for preparing XSLT translations for stream processing of data.

Briefly, the existing XSLT compiler works by building an Abstract Syntax Tree (AST) representing the XSLT transformation, step 1000 FIG. 14. A number of analyses such as type analysis and other operations are performed on the AST before it is converted to a series of low level instructions called "blocks". These blocks do not corresponding directly to machine instructions, but rather to some set of machine operations that achieve a higher level purpose, similar to a subroutine.

To accommodate streaming transforms, a number of new low level operations are needed. These "blocks" deal with interfacing to the runtime routines discussed above; for example, launching new strands, interrupting an output handler, or obtaining and manipulating the current parse event.

The majority of the streaming transformation takes place on the AST. First, an analysis is run to determine whether the transformation is streamable at all, step 1002. Only a subset of XSLT (or other transformations or translations) tend to be streamable. Transformations or translations which wander all over the tree or access data too many times are either not streamable or not worth streaming because the result would be less efficient than simply building the XML tree. If the transformation will be streamed, then a second analysis is done which determines what parts of the tree are accessed by which XSLT instructions and how many strands will be needed, step 1004. Finally, the blocks are generated and placed within a framework that walks the tree and assures that all events are either processed or skipped, step 1006.

Introduction to an AST

The AST describes the transformation or translation to be executed in a tree form that is similar to the original transformation, only marked up with additional information like typing and other inter-connections between portions of the transformation. Each AST node is contained within a parent node, and most represent some sort of value; for example, an expression like (2+3) would be represented by a node for "plus" with two children, one for the constant "2" and one for the constant "3". The "plus" node is thus considered to produce an integer which its parent uses in some way, just as the constant nodes produce an integer which is used by the "plus" node.

To Stream or Not to Stream?

The illustrative embodiment allows a user to specify whether to try to compile an FMRFD or XSLT translation as streamable. Ultimately, deciding whether a transformation or translation is streamable boils down to deciding whether it accesses data that is not available at the time of access. This means that operations that are legal in one context might not be legal in others. For example, it is possible for an XSLT transformation to build a temporary XML tree as part of its execution; should an XSLT transformation do this, it should be legal to perform any operation on the XML tree such as walking its nodes at will. However, when the XSLT transformation is referring to the input, it is important to be more cautious and monitor carefully which nodes are walked.

There are many ways to stream, such as allowing the user to access only the descendants of the current node at any given time, or its direct ancestors (and their attributes). Accessing the descendants makes sense: if the user wants to read a child named "foo" that hasn't arrived yet, an illustrative embodiment can simply screen through the children until "foo" arrives. In contrast, if the user wanted to "go" backwards and view children that had already arrived, it is possible that they have been discarded.

An illustrative embodiment does keep in the runtime a stack of all ancestors and their attributes, which is why they are allowed to be accessed. However, once the user has started walking up to an ancestor, they typically cannot then access the ancestor's children because those would be siblings or cousins of the current node, and might have already gone by or be outside the scope of its descendants. This is another example of an operation (looking at a node's children) that is legal in some descendants.

This information is calculated by walking the AST. Each AST node is provided with a structure indicating the context in which it is executing: this is essentially a structure describing which operations are legal. For example, it has a set of axis that may be legally walked, and a bit to indicate whether taking the string value of the context is legal.

Upon receiving the access structure, the AST node determines whether it can successfully execute in the restrictions imposed by the context. If it cannot, that indicates the transformation is not streamable: typically a warning is issued identifying the problem and the streaming analysis aborts. Otherwise, it computes a new context value and returns that to its caller; the new context value indicates what kinds of operations are legal on the value returned by the AST.

In the case of the example in the previous section, the "plus" node would return a context indicating that the value it computed was a scalar value, and thus no axis could be walked but its value could be taken, etc.

Building the Walk Tree and the Fragments

Once the system of the illustrative embodiment decides that something is streamable it proceeds into the block generation phase, step 1006 FIG. 14. The goal here is to build the program (executable instructions) that actually receives events, adds strands, and outputs the result. There is a lot of overlap with the same phase in the non-streaming style compiler; consider that many AST nodes, such as the "plus" node described above, don't change their operation at all. This means that the design should take advantage of this by not requiring a lot of duplicate code; ideally most of the instructions should be generated in the same way in both cases.

In order to explain how the non-streaming (tree based) and streaming compiler work together, it is necessary to introduce some of the basics of how the non-streaming compiler operates. In the non-streaming compiler, the program is compiled recursively from the AST. For the most, this is straightforward: compiling the expression "$a+$b", for example, would generate the instructions required to load the values of 'a' and 'b' and add them together. In the case of expressions that yield nodesets or sequences of values, however, the result returned by them is not a simple scalar value. Instead, it is essentially the mechanics of a loop and indications of where to fit in the body: for example, consider the XSLT instruction and its associated AST:

```
<xsl:for-each select="a/b">...</xsl:for-each>
for-each
  / \
 '/' ... (body of the AST)
 / \
a   b
```

The for-each instruction iterates through all of the nodes selected by the select expression, in this case 'a/b', and performs the instructions in its body on them. As the contents of the body are not important, they are simply indicated by ' . . . '. When this instruction is compiled, it will first try to compile the expression 'a/b'. 'a/b'' is represented in the AST by the following subtree:

```
  '/'
  / \
 a   b
```

The slash operator, located at the root of the subtree, is therefore the node which is asked to construct a sequence of values. It proceeds to construct a sequence of values for its left hand side—the left hand side constructs a loop which iterates over all children named 'a'. As discussed above, this is returned in the form of a loop with an empty body that can be filled in. The slash operator then constructs the body of the 'a' loop by asking its right hand side, the 'b', to construct a sub-loop iterating through all children named 'b'. This sub-loop is returned to the for-each, which then inserts the body of the loop based on the instructions within the for-each.

This system works very well in a tree-based processing system, where any expression can be evaluated at any time during the execution of the translator's generated code. In the streaming world, however, this system poses some challenges. Consider this template:

```
<xsl:template match="*">
  <xsl:value-of select="a/b"/>
  <xsl:value-of select="a/c"/>
</xsl:template>
```

In the non-streaming compiler, the process is to simply generate code to iterate through the first 'a/b' child and output its value, and then to find the first 'a/c' child. In the streaming compiler, however, it is necessary to deal with the data as it arrives, meaning that code can't be generated to iterate through 'a/b' on demand.

Figure 15:
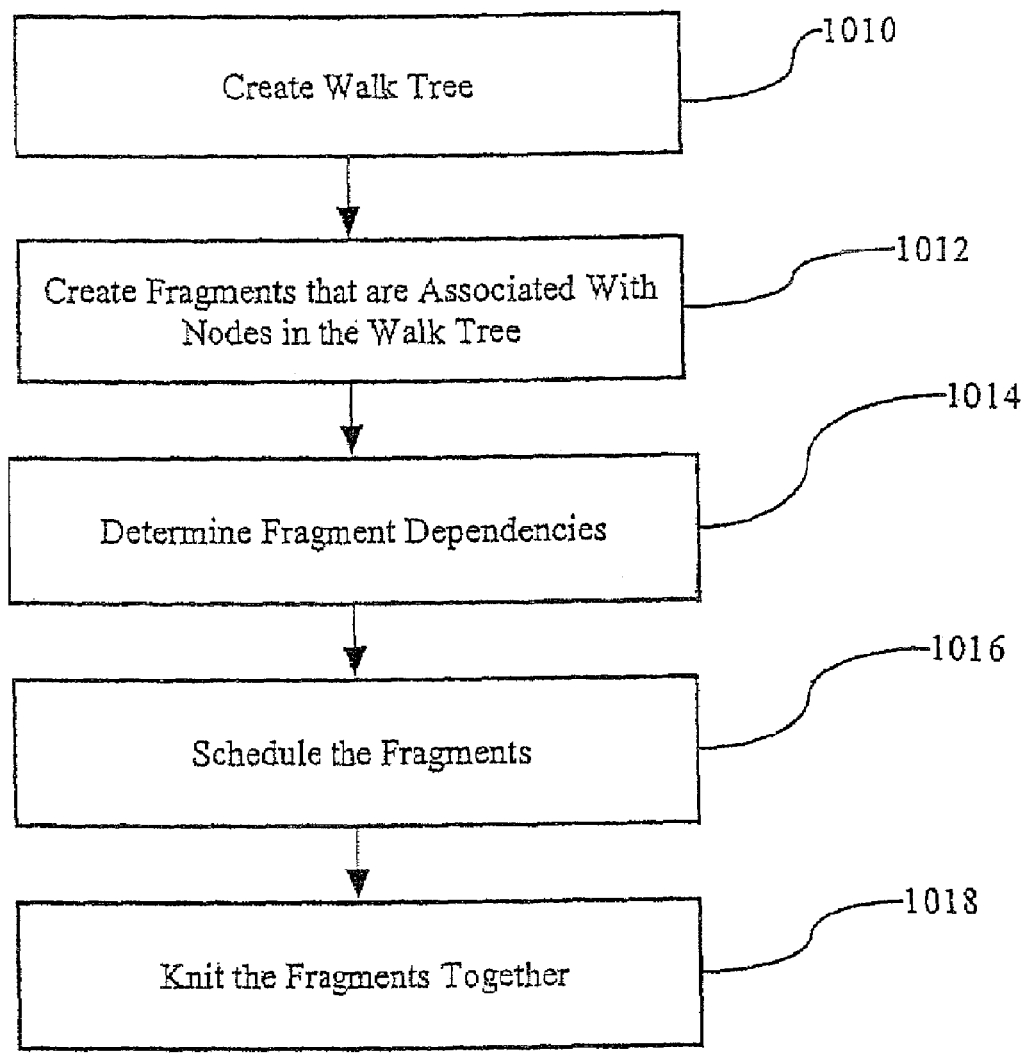
FIG. 15 is a flow chart for compiling translations for stream processing.

The illustrative embodiment addresses this in a two stage process. First it walks the XSLT instructions to build a "walk tree.", step 1010 FIG. 15. The walk tree indicates what nodes are accessed by various instructions. In this example, the walk tree would look like:

```
      .
      |
      a
     / \
    b   c
```

Because the template walks to a child of the current node (.) named 'a', and then to two of a's children, b and c. As the system builds the walk tree, it is also able to monitor whether multiple parts of the program will step on each others toes—i.e., try to do different things with the same data. In addition, for those parts of the program that walk over parts of the input, it associates walk nodes with the AST nodes. So, for example, the 'a/b' expression would be associated with the walk node 'b' above.

In addition to a set of children nodes, each walk node can be marked as "consumed." This means that the subtree of the children matching that walk node will be consumed in some kind of custom way that is not governed by the walk tree. For example, the value-of instruction would set that bit on the node associated with its select expression because it consumes all of the text node descendants of the element. Once the consumed bit is set, the system can detect a conflict when another instruction tries to use those same events.

For example, an XSLT transformation like:

```
<xsl:value-of select="a/b"/>
<xsl:value-of select="a/b/c"/>
``` would have a conflict because the first value-of consumes all text node descendants of 'a/b', but the second instruction then tries to walk the children of 'a/b' to find the 'c' children. This would require two strands to execute unless it is possible to merge the two operations, which is a further optimization.

Once the walk tree is built and the path expressions are associated with the appropriate walk nodes, the system does a normal compilation using the same mechanisms as in the tree-based processing model. The only difference is that instead of building the loop mechanics to walk the tree, the AST nodes create a new fragment registered with the appropriate node from the walk tree, step 1012.

Fragments are a set of blocks with a head and a tail; the head dominates all blocks in the fragment, and the tail post-dominates all blocks in a fragment. Each fragment is associated with a context; that context is a node in the walk tree, and determines what node will be the context when this fragment executes. It also determines, implicitly, when the fragment will execute.

During the initial compile phase, the fragments are not connected together. So, using the example of the template above, two fragments with identical instructions would be generated. One would correspond to the walk node for 'a/b', and one for 'a/c'. They would contain instructions for selecting the first matching node and printing out its string value. In pseudocode, these instructions would look like:

```
if counter == 0:
    print out string value
counter = counter + 1
```

Once the fragments are completely built, they must be knitted together and scheduled.

Scheduling and Breaking Output Dependencies

The previous section described how to go about generating fragments and a walk tree. The walk tree indicates where in the input the fragments will execute, and the fragments themselves describe what is to be done with the data for each node. There is one other component to the fragments that was not described before; each fragment can be dependent on other fragments. Therefore fragment dependencies must be computed, step 1014. If fragment A is dependent on fragment B, then that means that fragment B must execute before fragment A. This is usually because fragment A uses a value computed by fragment B; however, output is modeled as writing to a variable, which means that the dependency could be because both fragments A and B generates output, but the output from fragment B should come first.

To avoid searching all values read and written to compute dependencies between the fragments, the compiler nominates only values likely to cause dependencies to be checked. This is done at special pointers; for example, generating the code for the "sum( )" xpath function, which iterates over a set of nodes and computes the total of their values, requires first initializing a counter to zero, and then adding to its value. Since this variable which stores the sum is initialized before the children are walked, and then modified in a different context (once for each child), it would be an example of a variable worth nominating to be examined. In addition, the output handlers are always nominated.

Before the fragments can be knit together, they must be scheduled, step 1016. This is done via a simple greedy process. Based on the walk tree, the system creates a number of scheduling slots where a fragment can be placed. Any fragments placed in the same slot may well execute simultaneously, so they cannot be dependent on each other: The slots in which a fragment can go are determined by the context in which it executes.

For most templates, the system only creates three slots: the prologue, the children, and the epilogue. The prologue indicates what occurs before any children are of the context node are examined. The epilogue is the period after all children have been processed. These two slots are associated with the root of the walk tree. All other walk nodes are assigned to the middle slot, indicating that they can come in virtually any order. A fragment is scheduled only when all the fragments it depends on have been scheduled; at that point, the system tries to find a slot for it that is higher than the slots of all those fragments it depends on but still listed in the set of slots available to its context node. If the system cannot find such a slot (as it commonly cannot), it attempts to break dependencies so that it can squeeze it in earlier. If it fails to break dependencies, then the XML processing program can not be streamed.

The most common sort of dependency is an output dependency—in this case, the output of one fragment must come after the output of another fragment. In order to break this sort of dependency, an interrupted output handler is used. Basically, the system interrupts the output handler that both fragments use and replace it with the interrupted version. Interrupting, as previously stated, creates a new output handler to which all output will go BEFORE the existing output handler; therefore, the system replaces all uses of the old output handler in the fragments which the current fragment depends on with the newly created handler, thus ensuring that the output will go first. Now the system can usually schedule the fragment much more simply.

The present invention also includes a similar technique to break control flow dependencies—if one fragment A should only be conditionally executed based on a value computed by another fragment B, it is helpful to transform the program so that A always executes, but its output is ignored if it should not have been executed. This can be handled by creating a new fragment which reverts the output of A, and having that fragment execute conditionally based on the value produced by B, and removing the dependency from A to B. The sort of scheduling the compiler uses may not be optimal: sometimes it is possible to place a fragment A without breaking dependencies, but then later to find that other fragments which depend on A cannot be scheduled, though they could have been had the system broken dependencies on A. This is unusual and can usually be worked around, and the simple technique is generally sufficient.

Knitting the Fragments

Once the illustrative embodiment has scheduled all of the fragments, it enters a phase called the knitting phase which connects the fragments together, step 1018. Recall that the fragments are initially constructed in independent chunks that begin and end with a head and tail. The knitting stage constructs the depth first search framework which explores the input based on the walk tree. At each node in the walk tree, the system first links in all of the fragments assigned to that node; if the node has a prologue and an epilogue (usually only the context node), then the system first links in only the fragments assigned to the prologue. Otherwise, the system links in all of the fragments.

If the walk node is consumed by its fragments, then the job is done. Otherwise, the system must build instructions that load the next events and examine the children of the current node: if those children correspond to a walk node, the systems recursively processes the walk node. Otherwise, if the child does not correspond to any of the walk nodes in the tree, then it skip its contents.

Partial Streaming

The present invention also provides for a generalized form of streaming. If part of a stylesheet can be streamed and other parts cannot, another illustrative embodiment will stream the streamable parts and execute the non-streamable parts by building the XML tree for the data processed by the non-streamable part of the stylesheet.

As an example, consider a large XML file consisting of many small records of data. The processing of the data within a single record is complex and cannot be processed in streaming mode, however the processing of each record is independent. The system will process this data by reading a single record of data at a time, building the XML tree for that record, and applying the templates of the stylesheet to the single record using the non-streaming or DOM model. This minimizes the storage used while providing the generality of the non-streaming model.

Here are situations for the embodiment where partial streaming rather than full streaming applies. This may be a little slower than full streaming, but does keep the memory usage down. This means that before executing the command the program reads in the tree for that fragment of the input and then transforms it using the normal operations of a non-streaming stylesheet.

xsl:if commands are partially streamed.

xsl:choose and xsl:when partially stream. This is true of any conditional execution except for the xsl:foreach statement.

boolean tests between node sets where one of them is the input document will not stream since boolean equality or inequality of node sets involve a doubly nested loop.

Any stylesheet which checks a node for two different purposes will not stream. An example is a global variable which is assigned the value of a XPath expression that involves a descendent or child axes together with a set of templates that process the tree using template calls or apply-templates. Each of these requires a walk of the tree to perform their operation. Since they are completely independent, the embodiment does not stream the stylesheet.

Future versions of the network appliance may stream these features.

Note that there can be two different stylesheets that do exactly the same thing where one is streamable and the other is not. An example in point is the identity transform. The version that used to be in the network appliance was not streamable, the current version is streamable.

Note that although the data must be processed in order does not mean that it must be output in order. As previously described, the present invention includes mechanisms for delaying (and buffering) some output until other output which must precede it is computed. Thus for example it is entirely possible (but not necessarily practical) to write a stylesheet that output a tree where the nodes are in opposite order.

Streaming XML Schema Validation

The present invention provides for streaming of XML Schemas as well as other control files, translations etc. Output of Schemas can be parse events, or tree, or no output, and so an output of a schema validation check can be passed into a streaming XQuery transformation followed by a streaming XPath routing step. Provided they are implemented well, XML Schemas are always streamable via the present invention.

A schema complex type describes the sequence of elements contained within some parent element. There are three options: an ordered sequence of elements, an unordered choice of some set of elements, or all of a specified set in any order. A sequence of choice in turn may include other sequences or choices as one of its constituents. In the language of the schema specification, sequences, choices, and all groups are "model groups", and an element, namespace-based wildcard, or model group can be a "particle"; thus, a sequence specifies an ordered list of component particles.

A content model is compiled using the same infrastructure as the streaming XSLT compiler. At each point, it determines the set of names that can be the next element; these names can be full XML qualified names or a list of namespace URIs that are accepted. To validate a model group, the system first checks to see if the current event matches one of the names in the list. If it does, the system then checks each of the eligible constituents to see if it matches, and perform validation as appropriate.

For example, a content model might contain:

```
<xs:choice>
    <xs:sequence>
        <xs:element ref="a" minOccurs="0"/>
        <xs:element ref="b"/>
    </xs:sequence>
    <xs:element ref="c"/>
</xs:choice>
```

That is, either elements <a/><b/>, <b/>, or <c/>. The generated code first determines if the current element is one of a, b, or c; if not, then the XML document does not conform to the Schema. If it is a or b, then it corresponds to the sequence, and there is an additional check to see whether it is the optional a or the following b.

At every point, it can be determined where you are in a content model given only the qualified name of the current element. This is a Schema requirement given by the Unique Particle Attribution Constraint. There is a static check to confirm that the provided schema adheres to this constraint.

There are additional complications resulting from the xsi:schemaLocation attribute, which allows a document to specify the location of a schema it claims to conform to. If the system configuration indicates this attribute should be respected, a dynamic loader is invoked. This scans the input for the xsi:schemaLocation and xsi:noNamespaceSchemaLocation attributes without doing any validation. If these attributes are found, there is a check that the rules for these attributes are obeyed; then, document processing is suspended using the coroutine mechanism while the set of all schemas specified in all xsi:schemaLocation attributes is compiled together. This is not unlike the special situations presented by the evaluate( ) function or dynamic loading of XSL stylesheets from PI (processing instructions) embedded in incoming XML data, and demonstrates the advantages of dynamic code generation for network applications.

When compilation completes, the dynamic loader asks the compiled schema to validate the current element, followed by its sibling, and so on. Future xsi:schemaLocation attributes may cause further compilation. If this happens, the compiled schema knows that it should defer to the dynamic loader to cause validation of XML subtrees. In all cases, dynamic schema validation remains fully streaming.

The output of a schema validator according to the present invention, if the document is valid, is a copy of the input document with schema-specified default attribute and element values filled in. The importance of streaming is that the validation process can be started before having received the entire document, and therefore can validate documents larger than available system memory. There are a couple of schema constructs (identity constraints and the xs:ID simple type) that require remembering details about the input document, but the schema validator can still stream the input and remember these details as it sees them.

Streaming XPath Processing

The present invention provides for streaming of particular XML processing applications such as content-based routing, multicast XML routing, pub-sub XML routing, and other applications where a primary desire is to examine data on the fly and direct it to one or more destinations. The ability to perform streaming of XPath expressions provides several advantages including the ability to route or direct data without the need to consume all or a large portion of the XML-encoded data. The data or copies of the data can be routed to different destinations based on the evaluation of the Xpath expressions. Further, as additional fragments of the data is received, the XPath expressions may be reevaluated, and the data or its fragments can be sent to additional destinations.

Since streaming XSLT involves streaming XPath, the standalone processing of streaming XPath is largely a simplified subset of the analysis and execution passes discussed earlier. Indeed, as can be readily seem, issues with streaming XSLT or XQuery are frequently issues of whether specific XPath expressions contained within a stylesheet or query are streamable. If multiple XPath expressions have to be evaluated simultaneously, cross-expression optimization can be applied (e.g. CSE across commonly shared predicates). XPath 2.0 specification adds control flow and other features to XPath, making its compilation process more complex and more like that for XSLT. XPath is also a key building block of many other XML processing definitions, such as XQuery, XML Digital Signature & XML Encryption, STX, and others, and the ability to perform efficient XPath processing is important to all of them.

Streaming Web Services Security Processing

Security processing is critically important for B2B connectivity of all kinds, including those that rely on XML processing. As explained in an earlier portion of the disclosure, DoS (denial of service) attacks can be more quickly detected and rejected by a high-performance markup language processing engine, and being able to do so in a streaming fashion allows the malicious XML document to be rejected before its entire content is available. XML schema validation, as well as validation based on WSDL files (Web Services Description Language) is an essential component of web services security, and also benefits from the invention disclosed above.

WS-Security is a specification for securing XML/SOAP messages ratified by OASIS, and makes use of earlier W3C XML Encryption and W3C XML Digital Signature specifications. These building blocks allow sections of XML documents or who documents to be encrypted or digitally signed by the sender, and then decrypted and verified by the recipient. This message-level and field-level security is in contrast to bulk encryption of the transport channel, such as that provided by SSL/TLS or IPSec. The processing associated with WS-Security, XML ENC and XML DSIG is substantial, consisting of XML processing and common cryptographic operations (such as 3DES, RSA, etc.). Additional specifications use some of the same building blocks, for example SAML, WS-Trust, WS-SecureConversation and WS-SecurityPolicy, and have similar performance and scalability characteristics. While cryptographic operations can be accelerated using a variety of hardware and software methods known to those skilled in the art, the XML processing overhead associated with Web services security has been a challenging problem.

The present invention makes a key architectural innovation by treating WS-Security processing, including digital signing or encryption, as a transformation. This is observably correct: an input XML document is processed based on policy contained in one or more control files, and a different output XML document is produced. Error conditions (such as violations of the access control policy, failures of schema validation or digital signatures that fail verification) produce no output, but only side effects such as SOAP faults or security alerts. Digitally signing a section of an XML document involves finding the corresponding node set, canonicalization of the node set, performing hashing and digital signing operations, and finally inserting new nodes corresponding to the digital signature into the output document. Frequently the user will specify the locations of the section using XPath, or the network appliance system can be constructed to take user input and convert it into XPath. Because WS-Security uses SOAP headers, which come before the main message body, to provide information about XML cryptography and security tokens used by the incoming data stream, the processing may sometimes be confined to a small fraction of the input document while other situations require buffering the entire input or output.

Certain kinds of WS-Security processing are streamable, and others are not. A network appliance system cannot use an optimistic design and assume that streaming is always possible. By applying the invention, it is possible to detect which types of processing can be streamed, and which ones cannot. Partial streaming can be applied for processing SOAP headers as sub-trees, and out-of-order output is useful for generating WS-Security headers that depend on the content of the SOAP body. XML firewall filters can be defined as a series of XPath expressions or in the form of an XSLT stylesheet, and benefit from dynamic code generation. OASIS XACML (eXtensible Access Control Markup Language) is another means of defining security filtering in XML. In a typical use case, XACML defines a series of rules that are to be evaluated against an incoming request to determine if it should be allowed to proceed, and can be viewed as a type of FMRFD/DMAP transformation with side effects, leading to implementation by dynamically generating machine code instructions. All of the benefits of streaming XML processing apply to the specific use case of web services security processing, with the added benefit of increased security—by beginning security processing before the entire incoming datastream is available, it is possible to reject malicious or malformed datastreams sooner.

Regardless of how the security policy is defined, the streaming runtime and the compiler techniques for type analysis, breaking dependencies, etc., can be used to great advantage. In any place in the illustrative embodiment where XSLT or XPath could be used, it should be clear that XQuery, XML Schema, DTD, RELAX-NG, XACML, or another data definition language could be easily employed. For some types of control inputs, a different compiler front end would be added to produce the AST, but much of the subsequent processing would remain the same. Indeed, the techniques have applicability to other types of markup language processing at the data plane level, besides XML, such as SGML or some yet-unknown self-describing data format.

Although the invention has been shown and described with respect to illustrative embodiments thereof, various other changes, omissions and additions in the form and detail thereof may be made therein without departing from the spirit and scope of the invention.

APPENDIX A

A Detailed Examination of a Test Case

This is a detailed case study of an XSLT program, xslbench2, distributed as part of the XSLTMark test suite from Datapower Technology, Inc. It describes how the compile and run time techniques detailed above are deployed.

Here is the XSLT program known as xslbench2:

```
<xsl:template match="PLAY">
<html>
<head>
<title>
<xsl:value-of select="/PLAY/TITLE"/>
</title>
</head>
<body>
<h1><xsl:value-of select="/PLAY/TITLE"/></h1>
<xsl:apply-templates select="FM|PERSONAE|ACT"/>
</body>
</html>
</xsl:template>
<xsl:template match="FM">
<i><xsl:apply-templates/></i>
</xsl:template>
<xsl:template match="PERSONAE">
<h2>Parts - <xsl:value-of select="TITLE"/></h2>
<xsl:apply-templates select=".//PERSONA" />
</xsl:template>
<xsl:template match="PERSONA">
<p><b><i><xsl:value-of select="."/></i></b></p>
</xsl:template>
<xsl:template match="ACT">
<h3><xsl:value-of select="TITLE"/></h3>
<xsl:apply-templates select="SCENE"/>
</xsl:template>
<xsl:template match="SCENE">
<h3><xsl:value-of select="TITLE"/></h3>
<xsl:apply-templates select="SPEECH"/>
</xsl:template>
<xsl:template match="SPEAKER">
<p><b><xsl:value-of select="."/></b></p>
</xsl:template>
<xsl:template match="LINE">
<xsl:value-of select="."/><br/>
</xsl:template>
```

The first thing to note is that the templates represent a number of constant strings interspersed with XSLT actions. Rewriting the templates using names s0, s1,... for the strings rather than the strings themselves we have:

```
<xsl:template match="PLAY">
s0<xsl:value-of select="/PLAY/TITLE"/>
s1<xsl:value-of select="/PLAY/TITLE"/>
s2<xsl:apply-templates select="FM|PERSONAE|ACT"/>
s3
</xsl:template>
<xsl:template match="FM">
s4<xsl:apply-templates/>
s5
</xsl:template>
<xsl:template match="PERSONAE">
s6<xsl:value-of select="TITLE"/>
s7<xsl:apply-templates select=".//PERSONA" />
</xsl:template>
<xsl:template match="PERSONA">
s8<xsl:value-of select="."/>
s9
</xsl:template>
<xsl:template match="ACT">
s10<xsl:value-of select="TITLE"/>
s11<xsl:apply-templates select="SCENE"/>
</xsl:template>
<xsl:template match="SCENE">
s12<xsl:value-of select="TITLE"/>
s13<xsl:apply-templates select="SPEECH"/>
</xsl:template>
<xsl:template match="SPEAKER">
s14<xsl:value-of select="."/>
s15
</xsl:template>
<xsl:template match="LINE">
<xsl:value-of select="."/>
s16
</xsl:template>
```

Form of Default Template

Each template is implemented as a co-routine, as in the non-streaming model. When a template is called the current parser event (referenced by the global datum) is the start event for the tree referenced by the template. The template exits when the end event for the event at the start of the template has been consumed (although the next event has not been read yet). The template also has an output handler as a parameter as well as the parameters for the template. If there are parts of the subtree that are not of interest to this template then they must be skipped by using SkipSubTree( ).

In this example the root template is the default for matching "*". This means that it applies apply-templates recursively until some other template applies. If it finds character data along the way it outputs it. It is called with the first event already accessed. This was done in the init template.

```
coroutine default_template(dpStream d) {
// This is only called if the event is a StartElement
// It applies apply-template to its children
// Prints the text nodes
// and ignores the rest
// Note that it stops at a EndElement but does not need to
// check matching since the parser has already checked.
do {
getParserEvent( );
switch ( event->mType) {
case kStartElement:
if ( event->mSE.mName == Qname("PLAY") ) {
call template_PLAY(d);
} else if ( event->mSE.mName == Qname("FM") ) {
call template_FM(d);
} else if ( event->mSE.mName == Qname("PERSONAE") ) {
call template_PERSONAE(d);
} else if ( event->mSE.mName == Qname("ACT") ) {
call template_ACT(d);
} else if ( event->mSE.mName == Qname("PERSONA") ) {
call template_PERSONA(d);
} else if ( event->mSE.mName == Qname("SCENE") ) {
call template_SCENE(d);
} else if ( event->mSE.mName == Qname("SPEAKER") ) {
call template_SPEAKER(d);
} else if ( event->mSE.mName == Qname("LINE") ) {
call template_LINE(d);
} else {
default_template(d);
}
break;
case kCharacterData:
output(d,event->mCD.mData);
break;
default:
break;
}
} while ( event->mType != kEndElementData);
}
```

Form of Each Template—Start with PLAY

Now consider the first major template for PLAY. It has several actions. It outputs several strings. Including two strings that might not be computed yet. Then calls a restricted apply-templates.

It does have one unusual characteristic. It uses two strings that are (incidentally identical) rooted at the root of the tree. This means that the strands to compute them started in the initial template. The values need to be used here and may or may not be computed yet.

```
coroutine template__PLAY(dpStream d, dxpEvent event) {
output(d,s0);
? Output "/PLAY/TITLE"
output(d,s1);
? Output "/PLAY/TITLE"
output(d,s2);
// apply-templates select="FM|PERSONAE|ACT"
do {
event = getParserEvent( );
switch ( event->mType ) {
case kStartElement:
if ( event->mSE.mName == Qname("FM") ) {
call template__FM(d);
} else if ( event->mSE.mName == Qname("PERSONAE") ) {
call template__PERSONAE(d);
} else if ( event->mSE.mName == Qname("ACT") ) {
call template__ACT(d);
} else {
event = SkipSubTree ( );
}
break;
default:
break;
}
} while ( event->mType != kEndElementData );
output(d,s3);
event = SkipSubTree ( );
}
```

All of the rest of the templates fall into one of three categories. The first category consists of a single template so we will handle it first.

Form of Each Template—FM

FM is straight forward. We have already seen how to do applied templates, we have the code in the default template. We simply generate the same code and then output a string.

```
coroutine template__FM(Output d, dxpEvent *event) {
do {
event = getParserEvent( );
switch ( event->mType ) {
case kStartElement:
if ( event->mSE.mName == Qname("PLAY") ) {
call template__PLAY(d);
} else if ( event->mSE.mName == Qname("FM") ) {
call template__FM(d);
} else if ( event->mSE.mName == Qname("PERSONAE") ) {
call template__PERSONAE(d);
} else if ( event->mSE.mName == Qname("ACT") ) {
call template__ACT(d);
} else if ( event->mSE.mName == Qname("PERSONA") ) {
call template__PERSONA(d);
} else if ( event->mSE.mName == Qname("SCENE") ) {
call template__SCENE(d);
} else if ( event->mSE.mName == Qname("SPEAKER") ) {
call template__SPEAKER(d);
} else if ( event->mSE.mName == Qname("LINE") ) {
call template__LINE(d);
} else {
default_template(d);
}
break;
}
} while ( event->mType != kEndElementData );
Output(s5);
}
```

Form of Each Template—Persona, Speaker, Line

All three of these templates have the same form. The only difference is the places where constant strings are printed. Each is a value-of the current node. The value-of operation should be implemented as a library function call which is called with a stream (either for building a string or output) and the starting event. The value-of is then computed by walking the implicit tree until the matching kEndElementData is found. Actually the end Qnames do not need to be checked, the parser has guaranteed that they match—the routine only needs to check (recursively) for a terminating kEndElementData. The recursion is not necessary, only a counter to keep track of the depth

```
coroutine value-of (Output d, dxpEvent *event) {
int counter = 0;
do {
switch ( event->mType ) {
default:
event = getParserEvent( );
break;
case kStartElement:
counter++;
event = getParserEvent( );
break;
case kCharacterData:
Output(d,event->mCD.mData);
event = getParserEvent( );
break;
case kEndElement:
counter--;
}
} while ( counter > 0);
}
```

Now this coroutine is used in each of the templates. In the general case, the outside code must arrange that the current parse event involves the element needed. A separate routine is needed for attributes since they are encoded in an array in the kStartElement. Notice that in all three cases the kEndElement is certain of being the last event seen within the template so no need to call SkipSubTree ( ) is required.

```
coroutine template__PERSONA(Output d, dxpEvent *event) {
Output(d,s8);
call value-of(d);
Output(d,s9);
}
coroutine template__SPEAKER(Output d, dxpEvent *event) {
Output(d,s14);
call value-of(d);
Output(d,s15);
}
coroutine template__LINE(Output d, dxpEvent *event) {
call value-of(d);
Output(d,s16);
}
```

Form of Each Template—Personae, Act, Scene

These are the difficult templates since they involve two statements that involve walks of the tree. ACT and SCENE are a little simpler since they involve an applied templates on the children of the current event. Conceptually PERSONAE is more difficult since it involves the descendents rather than the children, however the code is actually simpler.

To handle the two simultaneous walks, the templates spawn another coroutine to perform those walks. That involves the creation and completion of two preceding streams.

```
coroutine template__SCENE(Output d, dxpEvent *event) {
Output(d,s12);
unhold(d);
create value__stream;
CreateChunkBefore(value__stream);
create apply__stream;
CreateChunkBefore(apply__stream);
Output(apply__stream,s13);
spawn corout1(Output value__stream, event); // Value-Of
do {
event = getParserEvent( );
switch ( event->mType ) {
case kStartElement:
if ( event->mSE.mName == Qname("SPEECH") ) {
call default__apply(apply__stream);
} else {
event = SkipSubTree ( );
}
default:
break;
}
} while ( event->mType != kEndElementData );
Unhold(value__stream);
// Return the current stream ? - how
}
coroutine template__ACT(Output d, dxpEvent *event) {
Output(d,s10);
unhold(d);
create value__stream;
CreateChunkAfter(value__stream);
create apply__stream;
CreateChunkAfter(apply__stream);
spawn corout2(Output value__stream, event); // Value-Of
Output(apply__stream,s11);
do {
event = getParserEvent( );
switch ( event->mType ) {
case kStartElement:
if ( event->mSE.mName == Qname("SCENE") ) {
call default__apply(apply__stream);
} else {
event = SkipSubTree ( );
}
default:
break;
}
} while ( event->mType != kEndElementData );
Unhold(value__stream);
// Return the current stream ? - how
```

The difference with PERSONAE is that the path expression for the applied templates is a descendent rather than a child. In streaming this is actually easier since a failure to match a start element does not require skipping the rest of the subtree.

```
coroutine template__PERSONAE(Output d, dxpEvent *event) {
Output(d,s8);
unhold(d);
value__stream = Interrupt (d)
spawn corout3(Output value__stream, event); // Value-Of
Output(d,s11);
done = false;
while (not done) {
event = getParserEvent( );
switch ( event->mType ) {
case kEndElement:
done = true;
break;
case kStartElement:
```

-continued

```
if ( event->mSE.mName == Qname("PERSONA") )
call template__PERSONA(d);
else
SkipSubTree ( );
break;
default:
break;
}
}
Unhold(value__stream);
}
```

Now we must create the three generated coroutines that are used to evaluate the value-of operations. We already have a value-of coroutine. It assumes that the parse action to be performed is the current event. So each of the coroutines must scan to find the correct event. Since we are dealing with value-of, we stop after generating the text for the first event that matches.

```
coroutine corout1(Output d, dxpEvent *event) {
// Generated coroutine for SCENE
// Look for a child "TITLE"
do {
switch ( event->mType ) {
case kStartElement:
if ( event->mSE.mName == Qname("TITLE") ) {
call value-of (d);
return;
} else {
SkipSubTree ( );
}
break;
default:
break;
}
event = getParserEvent( );
} while ( event->mType != kEndElementData );
}
```

Actually corout2 and corout3 are identical to corout1. The compiler should keep track of these simple facts and generate only one coroutine. Hence corout2 is eliminated and corout1 is called in place of it.

Form of the Initial Template

The initial template involves the setup of the environment and the computation of those global variables that can be precomputed. In this case there are no global variables hence the initial template has nothing to do except call the default template (in this case). There is one problem however. All path-expressions that are rooted at "/" need to be started in the initial template. A new stream needs to be created for each of them and the out-of-order evaluation techniques used to place the output in the proper place.

```
coroutine template__SCENE(Output d, dxpEvent *event) {
// Must compute value-of "/PLAY/TITLE" twice
create title1__stream;
CreateChunkAfter(title1__stream);
spawn corout4(title1__stream);
create title2__stream;
CreateChunkAfter(title2__stream);
spawn corout4(title2);
call default__template(d);
}
```

-continued

```
coroutine corout4(Output d, dxpEvent *event) {
do {
switch ( event->mType ) {
case kStartElement:
if ( event->mSE.mName == Qname("PLAY") ) {
event = getParserEvent( );
do {
switch ( event->mType ) {
case kStartElement:
if ( event->mSE.mName == Qname("TITLE") ) {
call value-of(d);
Unhold(d);
return;
} else {
event = skipParser(event);
}
default:
event = getParserEvent( );
}
} while ( event->mType != kEndElement);
event = getParserEvent( );
break
} else {
event = SkipSubTree ( );
}
default:
event = getParserEvent( );
break;
}
} while ( event->mType != kEndElement);
Unhold(d);
}
```

What is claimed is:

1. A method of processing XML data, said method comprising:

consuming a portion of an XML-encoded input data stream;

processing said consumed portion of an XML-encoded data stream based upon a transformation definition;

compiling at least one XSLT stylesheet, including performing an analysis of said at least one XSLT stylesheet, to determine whether at least some XML data to be processed in accordance with said at least one XSLT stylesheet can be processed in a streaming fashion;

outputting result data produced as a result of processing said consumed portion of an XML-encoded data stream on a processor according to said transformation definition before all of said XML-encoded input data stream has been consumed upon determining that the consumed portion of the XML-encoded data stream can be processed in a streaming fashion;

consuming the entire XML-encoded data stream and processing the consumed XML-encoded data stream on a processor using a non-streaming model upon determining that the consumed portion of the XML-encoded data stream cannot be processed in a streaming fashion.

2. The method of claim 1 wherein said step of processing said consumed portion of an XML-encoded data stream based upon a transformation definition includes producing side effects.

3. The method of claim 2 wherein said side effects include one of routing data, effecting a direction of flow of messages, or selection of subsequent processing steps.

4. The method of claim 1 wherein said transformation definition includes XML transforms, XSLT stylesheets, XPath expressions, XQuery, XACML, XML encryption, XML digital signature, web services security processing and XML Schemas.

5. The method of claim 1 wherein said step of performing analysis of said at least one XSLT stylesheet, to determine whether at least some XML data to be processed in accordance with said at least one XSLT stylesheet can be processed in a streaming fashion includes determining whether said at least one XSLT stylesheet specifies access to data that is not readily available at a time of such access; and wherein a streaming fashion comprises outputting result data before the XML-encoded input data stream is consumed.

6. The method of claim 1 wherein said step of outputting result data produced as a result of processing said consumed portion of an XML-encoded data stream according to said stylesheet, includes buffering at least some result data in an out of order buffer to maintain a proper order of outputting result data.

7. A method for transforming XML documents in streaming mode, said method comprising:

consuming a portion of an XML-encoded input data stream;

processing said consumed portion of an XML-encoded data stream based upon a transformation definition;

compiling at least one XSLT stylesheet, including performing an analysis of said at least one XSLT stylesheet related to at least one transformation definition, to determine whether at least some XML data to be processed in accordance with said at least one XSLT stylesheet can be processed in a streaming fashion;

generating executable machine instructions based on said step of compiling at least one XSLT stylesheet upon determining that the portions of the XML documents are streamable, said executable machine instructions to transform XML documents;

executing said executable machine instructions with aid of a streaming runtime process; and processing the XML documents on a processor using a document object model upon determining that the portions of the XML documents are not streamable.

8. The method of claim 7 wherein said step of analyzing said at least one transformation definition to determine if portions of it are streamable includes determining whether said at least one transformation definition specifies access to data that is not readily available at a time of such access.

9. The method of claim 7 wherein said step of compiling at least one XSLT stylesheet includes applying at least one optimization to generate optimized executable machine instructions.

10. The method of claim 7 where said XSLT stylesheet includes web services security processing.

11. The method of claim 7 where said compilation includes breaking up said XSLT stylesheet into multiple strands.

12. The method of claim 11 where said executable machine instructions making up the strands are executed on different processors.

13. The method of claim 9 wherein said at least one optimization includes common subexpression elimination, constant propagation, code motion, loop unrolling, strength reduction, peephole optimization, dead code elimination, LRE Folding, type resolution and tightening, adaptive profile-guided optimization, template or method specialization, and inlining.

14. The method of claim 7 wherein said transformation definition includes XML transforms, XSLT stylesheets, XPath expressions, XQuery definitions, XACML, XML encryption, XML digital signatures, and XML Schemas.

15. The method of claim 7 wherein transforming XML documents in streaming mode includes buffering at least some result data to maintain a proper order of outputting result data.

16. A network appliance device for performing streaming XML processing, comprising:
an input port to consume a portion of XML-encoded input data file;
executable machine instructions generated by compiling a XSLT stylesheet, wherein said compilation includes analyzing a transformation definition to determine whether XML-encoded data processed by a processor in accordance with said transformation definition can be processed in streaming mode, said executable machine instructions coupled to said input port, to process said portion of an XML-encoded input data file;
wherein upon determining that the portion XML-encoded input data file can be processed in streaming mode, said executable machine instructions processes said portion of an XML-encoded data file outputs result data before all of said XML-encoded input data file has been consumed by said input port.

17. The network appliance device of claim 16 further including at least one output buffer, said output receiving result data from said executable machine instructions, and wherein said output buffer holds result data until after other result data has been outputted by said executable machine instructions.

18. The network appliance device of claim 16 wherein said transformation definition includes XML transforms, XSLT stylesheets, XPath expressions, XQuery, XACML, XML Digital Signatures, XML Encryption, web services security processing and XML Schemas.

19. The network appliance device of claim 16 which serves primarily as a web services security gateway (also known in the industry as XML firewall or XML security gateway).

20. An apparatus for streaming mode XML processing, said apparatus comprising:
a compiler configured to compile at least one XSLT stylesheet and to generate executable machine instructions from XML processing definition files, said executable machine instructions to process input XML data in streaming mode;
an analyzer, operating in conjunction with the compiler, configured to perform an analysis of at least one XSLT stylesheet related to at least one transformation definition to determine if the input XML data can be processed in streaming mode;
a push-mode XML parser configured to produce parse trees or parse events based on said input XML data; and
a parse event distributor, to receive data from said push-mode XML parser and an out-of-order output buffering system to buffer output from processing said XML input data; and
a processor to output result data produced as a result of processing said XML-encoded data stream according to said XSLT stylesheet before all of said XML-encoded input data stream has been processed upon determining that the processed portion of the XML-encoded data stream can be processed in a streaming fashion.

21. A computer implemented method for processing of XML data, comprising:

receiving a portion of an encoded XML-encoded input data stream;
applying a transformation definition to the portion of the encoded XML-encoded input data stream, which includes executing a streaming compiling sequence, the streaming compiling sequence performing an analysis of at least one XSLT stylesheet related to the transformation definition in order to validate that the data from the portion of the encoded XML-encoded input data stream can be processed with respect to the XSLT stylesheet and can be stream processed on the fly;
outputting an output data stream subsequent to the streaming compiling sequence upon validating that the data from the portion of the encoded XML-encoded input data stream can be stream processed on the fly, the output data stream representing the portion of the encoded XML-encoded input data stream transformed according to the transformation definition, the output data stream created before the encoded XML-encoded input data stream is received in its entirety; and
processing the consumed XML-encoded data stream on a processor using a document object model upon validating that the data from the portion of the encoded XML-encoded input data stream cannot be stream processed on the fly.

22. The method as in claim 1, further comprising:
maintaining a cache for storing at least one XML document required by the XSLT stylesheet to perform said transformation definition, the cache comprising a fixed size table indexed according to a uniform resource locator associated with the at least one XML document.

23. The method as in claim 22, wherein storing the at least one XML document includes:
parsing the at least one XML document into a tree representing at least a portion of the at least on XML document.

24. The method as in claim 23, wherein storing the at least one XML document includes:
when the fixed size table of the cache is full upon attempting to the store the at least one XML document in the cache:
discarding a least recently used entry in the tree;
associating a newly added entry in the tree with at least a portion of XML data from the at least one XML document;
creating a first reference to be associated with the newly-added entry;
creating a second reference to be associated with at least one transformation activity that is currently using the at least one XML document.

25. The method as in claim 24, wherein discarding a least recently used entry in the tree includes:
determining a reference count associated with the discarding a least recently used entry in the tree is equal to zero.

26. The method of claim 1 wherein the non-streaming model comprises a document object model.

27. The method of claim 1 wherein the determination as to whether at least some XML data to be processed in accordance with said at least one XSLT stylesheet can be processed in a streaming fashion is made in conjunction with compiling the at least one XSLT stylesheet.

* * * * *